(12) United States Patent
Sheppard et al.

(10) Patent No.: US 12,443,971 B2
(45) Date of Patent: *Oct. 14, 2025

(54) METHODS, SYSTEMS, APPARATUS AND ARTICLES OF MANUFACTURE TO DETERMINE CAUSAL EFFECTS

(71) Applicant: The Nielsen Company (US), LLC, New York, NY (US)

(72) Inventors: Michael Sheppard, Holland, MI (US); Ludo Daemen, Duffel (BE); Edward Murphy, North Stonington, CT (US); Remy Spoentgen, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/400,425

(22) Filed: Dec. 29, 2023

(65) Prior Publication Data

US 2024/0185289 A1 Jun. 6, 2024

Related U.S. Application Data

(63) Continuation of application No. 17/893,921, filed on Aug. 23, 2022, now abandoned, which is a
(Continued)

(51) Int. Cl.
*G06Q 30/00* (2023.01)
*G06F 17/15* (2006.01)
(Continued)

(52) U.S. Cl.
CPC ......... *G06Q 30/0244* (2013.01); *G06F 17/15* (2013.01); *G06Q 30/0245* (2013.01); *G06F 17/18* (2013.01)

(58) Field of Classification Search
None
See application file for complete search history.

(56) References Cited

U.S. PATENT DOCUMENTS 7,152,081 B2 12/2006 Gremmert
8,364,516 B2 * 1/2013 Anderson .......... G06Q 30/0201
705/7.29
(Continued)

FOREIGN PATENT DOCUMENTS

WO 2020131730 A1 6/2020

OTHER PUBLICATIONS

Methods for Optimal Covariate Balance in Observational Studies for Causal Inference; Author: Vegetabile, Brian Garrett. Publication info: University of California, Irvine. ProQuest Dissertations Publishing, 2018. 10933538. (Year: 2018).*

(Continued)

*Primary Examiner* — Matthew T Sittner

(57) ABSTRACT

Methods, systems, apparatus, and articles of manufacture to determine causal effects are disclosed herein. An example apparatus includes a weighting engine to calculate a first set of weights corresponding to a first treatment dataset, a second set of weights corresponding to a second treatment dataset, and a third set of weights corresponding to a control dataset, the weighting engine to increase an operational efficiency of the apparatus by calculating the first set of weights, second set of weights, and third set of weights independently, a weighting response engine to calculate a first weighted response for the first treatment dataset, a second weighted response for the second treatment dataset, and determine a causal effect between the first treatment dataset and the second treatment dataset based on a difference between the first weighted response and the second
(Continued)

weighted response, and a report generator to transmit a report to an audience measurement entity.

19 Claims, 6 Drawing Sheets

Related U.S. Application Data continuation of application No. 17/167,759, filed on Feb. 4, 2021, now Pat. No. 11,461,804, application No. 18/400,425 is a continuation-in-part of application No. 16/230,035, filed on Dec. 21, 2018, now abandoned, said application No. 17/167,759 is a continuation of application No. 16/219,524, filed on Dec. 13, 2018, now Pat. No. 10,937,054.

(60) Provisional application No. 62/686,499, filed on Jun. 18, 2018, provisional application No. 62/685,741, filed on Jun. 15, 2018.

(51) Int. Cl.
*G06Q 30/0242* (2023.01)
*G06F 17/18* (2006.01)

(56) References Cited

U.S. PATENT DOCUMENTS

| | | |
|---|---|---|
| 2008/0312948 A1 | 12/2008 | Kalliola |
| 2010/0138285 A1 | 6/2010 | Leonard et al. |
| 2014/0100945 A1 | 4/2014 | Kitts et al. |
| 2014/0100947 A1 | 4/2014 | Kitts et al. |
| 2016/0253696 A1 | 9/2016 | Gui et al. |
| 2017/0061470 A1* | 3/2017 | Sheppard ........... G06Q 30/0242 |
| 2017/0161772 A1 | 6/2017 | Xu et al. |
| 2017/0193545 A1* | 7/2017 | Zhou ................. G06Q 30/0254 |
| 2017/0323326 A1 | 11/2017 | Kim et al. |
| 2017/0345049 A1 | 11/2017 | Banerjee et al. |
| 2019/0236287 A1* | 8/2019 | Remy ................ G06Q 30/0254 |
| 2020/0202382 A1 | 6/2020 | Chen et al. |
| 2020/0202383 A1 | 6/2020 | Sheppard et al. |

OTHER PUBLICATIONS

Systematic Evaluation and Comparison of Entropy Balancing and Covariate Balancing Propensity Score Methods; Author: Reshetnyak, Evgeniya. Publication info: Fordham University. ProQuest Dissertations Publishing, 2017. 10278790. (Year: 2017).*

Entropy balancing: a maximum-entropy reweighting scheme to adjust for coverage error; Author: Watson, Samantha K; Elliot, Mark. Publication info: Quality and Quantity 50.4: 1781-1797. Springer Nature B.V. (Jul. 2016) (Year: 2016).*

Hasselt et al., "Bayesian Estimation of the Complier Average Causal Effect," The University of North Carolina Greensboro, Dec. 2017, 33 pages.

Hofler, "Causal Inference Based on Counterfactuals," Max Planck Institute of Psychiatry, Sep. 13, 2005, 12 pages.

International Search Report and Written Opinion received in PCT Application No. PCT/US2019/066593, mailed on Apr. 16, 2020, 8 pages.

Fisher et al., "Time-Dependent Covariates In The Cox Proportional-Hazards Regression Model", Annual Review of Public Health. 1999. 20:145-57, 14 pages.

Maasoumi et al., "The Information Basis of Matching with Propensity Scores," Southern Methodist University, Jun. 2006, 18 pages.

Osamu Yoshimura, "Adjusting responses in a Non-probability Web Panel Survey by the Propensity Score Weighting", The National Center for University Entrance Examinations, 2004, 6 pages.

Shore et al., "Axiomatic Derivation of the Principle of Maximum Entropy and the Principle of Minimum Cross-Entropy," IEEE Transactions on Information Theory, Jan. 1, 1980, 12 pages.

Gruber et al., "Targeted Maximum Likelihood Estimation: A Gentle Introduction", University of California, Berkeley, U.C. Berkeley Division of Biostatistics Working Paper Series, 2009, Paper 252, 17 pages.

Hothorn et al., "Unbiased Recursive Partitioning: A Conditional Inference Framework", This is a preprint of an article published in Journal of Computational and Graphical Statistics, vol. 15, No. 3, 2006, 21 pages.

United States Patent and Trademark Office, "Non-Final Office Action," issued in connection with U.S. Appl. No. 16/230,035, filed Aug. 14, 2020, 40 pages.

United States Patent and Trademark Office, "Final Office Action," issued in connection with U.S. Appl. No. 16/230,035, filed Mar. 24, 2022, 19 pages.

United States Patent and Trademark Office, "Non-Final Office Action," issued in connection with U.S. Appl. No. 16/230,035, filed Aug. 15, 2022, 27 pages.

United States Patent and Trademark Office, "Final Office Action," issued in connection with U.S. Appl. No. 16/230,035, filed Dec. 15, 2022, 28 pages.

United States Patent and Trademark Office, "Non-Final Office Action," issued in connection with U.S. Appl. No. 16/230,035, filed Jun. 8, 2023, 14 pages.

United States Patent and Trademark Office, "Final Office Action," issued in connection with U.S. Appl. No. 16/230,035, filed Dec. 14, 2023, 13 pages.

* cited by examiner

METHODS, SYSTEMS, APPARATUS AND ARTICLES OF MANUFACTURE TO DETERMINE CAUSAL EFFECTS

RELATED APPLICATION

This patent application is a continuation of U.S. patent application Ser. No. 17/893,921, filed Aug. 23, 2022, which is a continuation of U.S. patent application Ser. No. 17/167,759, filed Feb. 4, 2021, and which issued as U.S. Pat. No. 11,461,804, and which is a continuation of U.S. patent application Ser. No. 16/219,524, filed Dec. 13, 2018, and which issued as U.S. Pat. No. 10,937,054, and which claims the benefit of U.S. Provisional Patent Application No. 62/685,741, filed Jun. 15, 2018, and U.S. Provisional Patent Application No. 62/686,499, filed Jun. 18, 2018. This patent application is also a continuation-in-part of, and claims priority to, U.S. patent application Ser. No. 16/230,035, filed Dec. 21, 2018. U.S. patent Application Ser. Nos. 17/893,921; 17/167,759; 16/219,524; 62/685,741; and 62/686,499 are hereby incorporated herein by reference in their entireties. Priority to U.S. patent application Ser. Nos. 17/893,921; 17/167,759; 16/219,524; 16/230,035; 62/685,741; and 62/686,499 is hereby claimed.

FIELD OF THE DISCLOSURE

This disclosure relates generally to audience measurement and, more particularly, to methods, systems, apparatus and articles of manufacture to determine causal effects.

BACKGROUND

In recent years, market research efforts have collected market behavior information to determine an effect of marketing campaign efforts. During some marketing campaign efforts, adjustments are made to one or more market drivers, such as a promotional price of an item, an advertisement channel (e.g., advertisements via radio, advertisements via television, etc.), and/or in-store displays. Market analysts attempt to identify a degree to which such adjustments to market drivers affect a marketing campaign objective, such as increased unit sales.

BRIEF DESCRIPTION OF THE DRAWINGS

Wherever possible, the same reference numbers will be used throughout the drawing(s) and accompanying written description to refer to the same or like parts, elements, etc.

DETAILED DESCRIPTION

Figure 1:
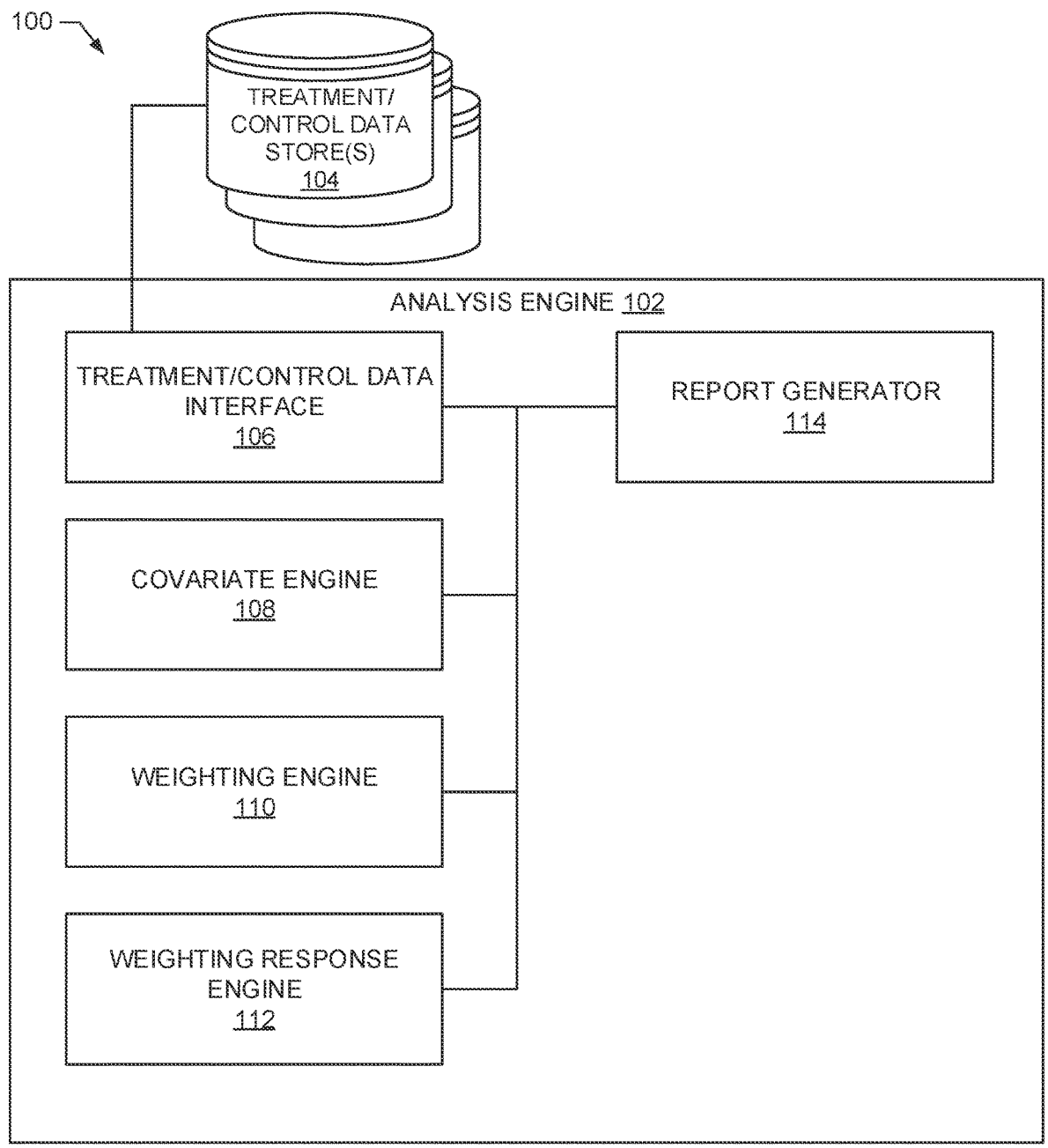
FIG. 1 illustrates an example analysis engine to determine causal effects for audience measurement in accordance with teachings disclosed herein.

Market researchers seek to understand whether adjusting variables within their control group dataset have a desired effect. In some examples, variables that can be controlled by personnel and/or entities (e.g., manufacturers, merchants, retailers, etc., generally referred to herein as "market researchers") interested in the desired effect include a price of an item, a promotional price, a promotional duration, a promotional vehicle (e.g., an adjustment related to distributed media such as television, radio, Internet, etc.), a package design, a feature, a quantity of ingredients, etc. In short, if the market researcher knows that changing a variable (e.g., a cause) leads to achievement of the marketing campaign objective (e.g., an effect), then similar marketing campaigns can proceed with a similar expectation of success.

Industry standard statistical methodologies distinguish between gathering data to identify a relationship between a variable (e.g., a market driver under the control of the market researcher) and a result (e.g., an effect observed when the variable is present) versus whether such variables are the cause of the observed result. Stated differently, market researchers know that correlation does not necessarily mean causation. Positive correlations can be consistent with positive causal effects, no causal effects, or negative causal effects. For example, taking cough medication is positively correlated with coughing, but hopefully has a negative causal effect on coughing.

Causation, unlike correlation, is a counterfactual claim in a statement about what did not happen. The statement that "X caused Y" means that Y is present, but Y would not have been present if X were not present. Caution must be exercised by market researchers regarding potential competing causes that may be present when trying to determine a cause of observed outcomes to avoid absurd conclusions. An example statement highlighting such an absurd conclusion in view of causation is that driving without seat belts prevents deaths from smoking because it kills some people who would otherwise go on to die of smoking-related disease. Competing causes may be further illustrated in a statement from the National Rifle Association that "guns don't kill people, people kill people." In particular, one competing cause is that if you take away guns and you observe no deaths from gunshot wounds, then guns are a cause. However, another competing cause is that if you take away people and you have no deaths from gunshot wounds, then people (e.g., shooters) are a cause. As such, both illustrate simultaneous causes of the same outcome. To frame an analysis in a manner that avoids extreme and/or otherwise absurd conclusions, the question of whether "X causes Y" is better framed as "how much does X affect Y."

Determining causal effects from observation studies is a well-studied problem in the technical field of behavioral research. Determining causal effects from observation studies is different from experimental designs as the subjects choose to be either in a treatment group or in a control group (in binary setting), in contrast to experimental designs where the subjects are selected for a treatment group or a control group classification randomly. This non-random assignment of subjects confounds causal effects and adds bias (e.g., introduces error into further processing). To alleviate this bias, example algorithms such as Propensity Score matching and Inverse Propensity Score Weighting may be applied. However, these algorithms only account for observable data of the treatment group dataset, which allows any hidden bias due to latent variables to remain. Another downfall of such algorithms is that the algorithms require large samples with substantial overlap between the treatment group dataset and the control group dataset to produce results with some degree of reliability. Further, prior techniques, such as multivariate reweighting, exhibit one or more data co-dependencies that require that the treatment group dataset be analyzed first and the control group dataset second. That is, prior techniques require processing the treatment group dataset to process the control group dataset. Such techniques require additional processing cycles which burdens a processor.

Example methods, systems, apparatus and articles of manufacture disclosed herein determine causal effects for audience measurement technologies and technical fields without the cultivation and/or processing of corresponding information that is typically required to remove bias during a causation study. Computational costs/burdens required to enable such technologies and/or behavioral fields are also reduced by examples disclosed herein by eliminating any need to acquire, sort, clean, randomize and/or otherwise manage separate information. Examples disclosed herein also reduce processing burdens when determining causal effects by avoiding and/or otherwise prohibiting computationally intensive parametric numerical approaches and/or regressions. Further, because examples disclosed herein avoid parametric numerical approaches, causation determination results in a relatively lower error. Examples disclosed herein can perform operations without performing individualized processing of treatment group datasets and control group datasets (e.g., without requiring a processor to perform a subsequent weighting process of other computer-based causal effect processes such as multivariate reweighting.). That is, examples disclosed herein analyze the treatment group datasets and control group datasets independently (e.g., in a manner in which treatment group dataset and control group dataset are not co-dependent) such that treatment group dataset and control group dataset can be analyzed substantially simultaneously (e.g., utilizing the same processing cycle), which eliminates unnecessary processing cycles and reduces the burden on a processor.

FIG. 1 is a schematic illustration of an example environment 100 constructed in accordance with the teachings of this disclosure to determine causal effects for audience measurement. The illustrated example of FIG. 1 includes an example analysis engine 102 and one or more treatment/control data store(s) 104. The example analysis engine 102 includes an example treatment/control data interface 106 communicatively coupled to the one or more treatment/control data store(s) 104, an example covariate engine 108, an example weighting engine 110, an example weighting response engine 112, and an example report generator 114. In some examples, the covariate engine 108 is a means for generating a covariate, or a covariate generating means. In some examples, the weighting engine 110 is a means for calculating a weight, or a weight calculating means. In some examples, the weighting response engine 112 is a means for determining a weighted response, or a weighted response determining means. In some examples, the report generator 114 is a means for generating a report, or a report generating means.

In operation, the example treatment/control data interface 106 of FIG. 1 retrieves and/or otherwise receives treatment/control group datasets from the example treatment/control data store(s) 104. Example methods, apparatus, systems and/or articles of manufacture disclosed herein discuss treatment/control group datasets related to an advertisement campaign, but examples disclosed herein are not limited thereto. Other example treatment/control group datasets for which causal effects may be determined include, but are not limited to, drug trial data, tweets, product purchase instances, etc. The treatment/control group datasets to be described in connection with example operation of the analysis engine 102 includes data for males and females that (a) were exposed to an advertisement of interest and (b) were not exposed to the advertisement of interest. In some examples, the treatment/control group datasets may include an effect value that relates to an amount of change or perceived change when either viewing an advertisement of interest or an amount of change or perceived change when not viewing the advertisement of interest. Additionally, the treatment/control group datasets may include other demographic and/or categorical information that may be of interest such as age, race, economic class, etc., for example.

The example covariate engine 108 of FIG. 1 generates data categories based on the information from the treatment/control data store(s) 104. For example, the covariate engine 108 identifies an individual (i) from the treatment/control group datasets and identifies weights and/or covariates (e.g., demographics, age, race, etc.) associated with the individual for processing. In some examples, the treatment/control datasets may not include weights (e.g., the treatment/control datasets only include covariates). The example covariate engine 108 separates the treatment/control group datasets such that they are mutually exclusive (e.g., the treatment group dataset is separate from the control group dataset). Once the data has been separated, the example covariate engine 108 maximizes entropy (H) subject to the weights (w) summing to 100% such that the weights on the control group dataset match the sample average of the weights in the treatment group dataset. In some examples, the covariate engine 108 maximizes the entropy in a manner consistent with example Equation 1.

Maximize $w$ \hfill Equation 1

$$H = -\sum_{Z_i=0} w_i \log(w_i)$$

Subject to $$\sum_{Z_i=0} w_i = 1$$

$$\sum_{Z_i=0} w_i c_j(X_i) = \frac{1}{n_1} \sum_{Z_i=1} c_j(X_i) j = 1, \ldots, m$$

In the illustrated example of Equation 1, w represents the weight for an individual person (i) in the control, c represents the covariate (j) currently being processed (e.g., demographic, age, income, etc.), X represents all of the covariates for that individual, $n_1$ represents the number of people in the observed treatment, and Z represents what was observed for that individual. For example, Z=0 represents the individual was part of the control group dataset, and Z=1 represents the individual was part of the treatment group dataset. The covariate engine 108 maximizes the entropy to mitigate illogical results. In effect, such entropy maximization efforts by the example covariate engine 108 reduces and/or otherwise minimizes a bias effect.

In some examples, the covariate engine 108 utilizes a weighted average $\Sigma_{z_i=0} w_i^{EB} Y_i$ to estimate a counterfactual mean E[Y(0)|T=1], where E represents the expected value of all individuals or subjects in both the treatment group dataset and the control group dataset, Y(0) represents a response of not viewing the advertisement, and T=1 is the treatment indicator (e.g., T=0 represents control indicator). That is, E[Y(0)|T=1] represents a counter-factual response of not viewing the advertisement, but the individual actually viewed the advertisement (e.g., an individual in the treatment viewed an advertisement, but was classified as not viewing the advertisement). In some examples, the covariate engine 108 determines the average treatment effect for the treated (ATT) represented by $\hat{\gamma}_{ATT}^{EB}$, where EB stands for Entropy Balanced, in a manner consistent with example Equation 2. The example covariate engine 108 also maximizes the Entropy (H) for the control group dataset in a manner consistent with example Equation 3, where v represents the weights for the control group dataset.

$$\hat{\gamma}_{ATT}^{EB} = \sum_{z_i=1} \frac{1}{n_1} Y_i - \sum_{z_i=0} w_i^{EB} Y_i \quad \text{Equation 2}$$

Maximize $v$ \hspace{2cm} Equation 3

$$H = -\sum_{Z_i=1} v_i \log(v_i)$$

Subject to $$\sum_{Z_i=1} v_i = 1$$

$$\sum_{Z_i=1} v_i c_j(X_i) = \frac{1}{n_0} \sum_{Z_i=0} c_j(X_i) j = 1, \ldots, m$$

The example covariate engine 108 estimates the Average Treatment effect for the control (ATC) in a manner consistent with example Equation 4.

$$\hat{\gamma}_{ATC}^{EB} = \sum_{z_i=1} v_i^{EB} Y_i - \sum_{z_i=0} \frac{1}{n_0} Y_i \quad \text{Equation 4}$$

When determining ATT and ATC, the constraints must match to the sample average of the other group. For example, the constraints for the treatment group dataset must match the sample average of the control group dataset. However, for ATE, both sets of weights must vary. That is, the overlap is needed because it would be mathematically impossible for the constraints of the treatment group dataset to match the sample average of the control group dataset, for example, if no overlap was present. For example, assuming two groups of ages: group 1 being ages 20-30 and group 2 being ages 80-90, it is impossible to match group 1 to group 2 because there is no overlap. However, assuming another two groups of ages: group 1 being ages 20-30 and group 2 being ages 15-40, a match can be made to a same average value (e.g., 27).

In some examples, the covariate engine 108 of FIG. 1 determines a first set of covariates to be processed for a treatment group dataset of an advertisement campaign and a second set of covariates to be processed for a control group dataset of the advertisement campaign. In some examples, the treatment group dataset is indicative of participant (or individual or subject) behaviors associated with exposure to an advertisement, while the control group dataset is indicative of participant behaviors associated with not being exposed to the advertisement. In some examples, the covariate engine 108 processes the treatment/control group datasets from the example treatment/control data store(s) 104 to determine which covariates to balance. For example, the covariate engine 108 may separate the data into treatment group datasets and control group datasets. The covariate engine 108 may identify all the covariates present in the treatment group datasets and all the covariates present in the control group datasets, for example. The example covariate engine 108 identifies covariates that are similar (e.g., include at least one of the same covariate) across both the treatment group datasets and control group datasets. The example covariate engine 108 may identify these covariates as covariates to balance.

The example weighting engine 110 of FIG. 1 calculates a first set of weights for the first set of covariates corresponding to the treatment group dataset, and calculates a second set of weights for the second set of covariates corresponding to the control group dataset using maximum entropy. For example, the example weighting engine 110 may apply the maximum entropy techniques in a manner consistent with example Equation 1 described above, or in a manner consistent with example Equations 5 and 6 described in more detail below, to find weights for each participant in the control group dataset and each participant in the treatment group dataset so the weighted covariates are equal between both groups. In some examples, the first set of weights is to equal the second set of weights. However, the example weighting engine 110 determines the weights for each of the treatment group dataset and control group dataset simultaneously. As used herein, "simultaneously" refers to at substantially the same time (e.g., a same clock cycle) and/or calculated without inter-dependence on the other group. As such, the weighting of the treatment group dataset neither influences nor is dependent upon the weighting of the control group dataset. Such weighting by the example weighting engine 110 reduces the amount of processing cycles required to determine weights for the respective control and/or treatment group datasets because a processor does not need to execute a first processing cycle (e.g., a group of first processing cycles) for the treatment group dataset and a second processing cycle (e.g., a group of second processing cycles) for the control group dataset. Instead, the first processing cycle is sufficient with regard to examples disclosed herein. Further, the weighting engine 110 increases the operational efficiency of the analysis engine 102 by simultaneously determining the weights for both the treatment group dataset and the control group dataset.

The example weighting response engine 112 calculates a weighted response value for the treatment group dataset and a weighted response value for the control group dataset based on the first set of weights and the second set of weights without requiring a processor to perform a subsequent weighting process of other computer-based causal effect processes. That is, the weighting response engine 112 does not need a first processing cycle to determine a weighted response for the treatment group dataset, and a second processing cycle to determine the weighted response for the control group dataset. For example, the weighting response engine 112 bypasses multivariate reweighting by calculating a weighted response for the datasets based on the equations described in more detail below. The example weighting response engine 112 outputs a weighted treatment group dataset measurement that is on a common scale (e.g., a same unit of measure, a compatible unit of measure, etc.) with the weighted control group dataset. As such, the example weighting response engine 112 outputs common scale measurements that can be utilized in subsequent processing. The example weighting response engine 112 determines a difference between the weighted treatment group dataset and the weighted control group dataset to determine the Average Treatment Effect (ATE) as described in more detail below. The resulting ATE from the weighting response engine 112 represents the potential outcome of an individual viewing an advertisement of interest. For example, the resulting ATE may represent the increase in sales per person based on an individual viewing an advertisement. In some examples, an ATE measurement may be calculated for multiple advertisements, which are subsequently compared to identify the most effective advertisement.

The example report generator 114 generates a report indicating a causal effect of the advertisement campaign based on a difference between the weighted response for the treatment group dataset and the weighted response for the control group dataset. For example, the example report generator 114 receives and/or retrieves the ATE results from the weighting response engine 112, and generates a report. The report generated by the example report generator 114 may subsequently be provided to a measurement entity and/or another interested party. In some examples, the report generator 114 displays the report on a device via a webpage in a first state with a set of options. For example, the report generator 114 may display the report on a device via a webpage in a first state which displays the treatment group data set and control group dataset with selectable drop down options (e.g., different levels of detail such as group level, individual level, etc.) which change the state of the display (e.g., selecting and option of the drop down menu for the treatment group dataset changes the state of the display to a second state based on the option selected). The example set of options may be selectable by a user to change the state of the display to view different types of information in the report.

The following equations may be utilized by the covariate engine 108, the weighting engine 110, the weighting response engine 112 and/or more generally the analysis engine 102 to determine the causal effect for audience measurement. In some examples, the example analysis engine 102 utilizes Equation 1 to find weights on the covariate of the control group dataset to match the expected value (or sample average) of the covariate in the treatment group dataset. The example analysis engine 102 matches the covariate moments of the control group dataset, subject to them having to equal the treatment group dataset. The justification for this is typically a counterfactual quantity must be estimated by weighting the counterfactual quantity and matching the counterfactual quantity to treatment group dataset covariates. However, for ATC it is the reverse, the example analysis engine 102 determines weights on the treatment group dataset to match the control group dataset in a manner consistent with example Equation 3.

Examples disclosed herein allow both sets of weights (e.g., weights of the treatment group dataset, weights of the control group dataset) to vary. The example analysis engine 102 weights both the control group dataset and treatment group dataset to estimate an average treatment effect (ATE). The example analysis engine 102 utilizes a double entropy balancing where two sets of weights (e.g., treatment group dataset weights, control group dataset weights) are simultaneously solved such that the resulting weights of the treatment group dataset and the resulting weights of the control group dataset match a weighted average. The example weighting engine 110 maximizes an entropy value (H) subject to particular linear constraints, and for the resulting entropy value to be consistent with logic, the example weighting engine 110 utilizes a generalized KL-divergence value, of which Maximum Entropy is a special case. In some examples, the weighting engine 110 maximizes an entropy value in a manner consistent with Equation 5.

Maximize $w, v$      Equation 5

$$H = \left(-\sum_{Z_i=1} v_i \log(v_i)\right) + \left(-\sum_{Z_i=0} w_i \log(w_i)\right)$$

Subject to the following linear constraints $$\sum_{Z_i=1} v_k = 1$$

$$\sum_{Z_i=0} w_k = 1$$

$$\sum_{Z_i=1} v_i c_j(X_i) = \sum_{Z_i=0} w_i c_j(X_i) \quad j = 1, \ldots, m$$

In the illustrated example of Equation 5, (k) represents a group (e.g., treatment group dataset 1, control group dataset 4, etc.). The example weighting engine 112 determines the Average Treatment Effect in a manner consistent with Equation 6.

$$\hat{\gamma}\text{ATE} = \Sigma_{z_i=1} v_i Y_i - \Sigma_{z_i=0} w_i Y_i \quad\quad \text{Equation 6:}$$

In the illustrated example of Equation 6, Y represents an outcome (e.g., monetary increase) of viewing an advertisement which comes from the control data. The resulting ATE value is representative of a potential dollar increase if the advertisement of interest (e.g., the advertisement analyzed using Equations 5 and 6) is viewed by an individual. Solving for the weighted propensity score using the weights solved for using Equations 5 and 6, and the covariates which are a subset of the covariates used in solving for those weights, the resulting probability of being in the treatment group dataset would be 50% for every individual in the entire sample. With the weights solved using Equations 5 and 6, the covariates are independent of assignment of treatment group dataset and it is a fair coin toss (e.g., random) of being assigned to the treatment group dataset. Although an unbiased coin is not required for causal estimates, just random assignment, the statistical power of the results are maximized and/or otherwise improved when the assignment is unbiased and 50%:50% for a binary classification of treatment group dataset and control group dataset.

Solving for the constraints when they are equal may seem odd because they are unknown. However, this can be done by rephrasing the problem, which is mathematically identical. The constraint that the sum must be 100% is usually explicitly incorporated within as a normalization, which is unfortunate as it treats the constraint unique over any other constraint. Treating the sum=100% like any other constraint results in m+2 constraining equations among $n=n_0+n_1$ probabilities. As Entropy is additive this also does not change the optimization function. In other words, by changing notation, the entropy maximization is simplified in a manner consistent with example Equation 7.

The analysis engine 102 allows the weights to vary (e.g., the weights are calculated independent of one another). As such, the weighting engine 110 may change the notation of Equation 5 in a manner consistent with Equation 7.

Maximize $p$ $$H = - \sum_{i=1}^{n_1+n_0} p_i \log(p_i)$$

Equation 7

Subject to $$\sum_{i=1}^{n_1} p_i = 1$$

$$\sum_{i=n_1+1}^{n} p_i = 1$$

$$\sum_{Z_i=1} p_i c_j(X_i) - \sum_{Z_i=0} p_i c_j(X_i) = 0 \quad j = 1, \ldots, m$$

In the illustrated example of Equation 7, p represents both the weights for the treatment group dataset and the weights for the control group dataset. That is, both the weights for the treatment group dataset and the weights for the control group dataset are mapped to a uniform weighting identifier (p). Both normalizations are incorporated as two separate constraints and result in the additional m covariate balancing constraints. In the illustrated example of Equation 7, because both weights are represented by p, the weighting engine 110 keeps track of the treatment group dataset weights and the control group dataset weights by utilizing positive and negative Lagrange Multipliers ($\lambda$) in a manner consistent with Equation 8.

$$v_i = \exp\left(\lambda_0^{(1)} + \sum_{j=1}^{m} \lambda_j c_j(x_i)\right)$$

$$w_i = \exp\left(\lambda_0^{(0)} + \sum_{j=1}^{m} (-\lambda_j) c_j(x_i)\right)$$

Equation 8

In the illustrated example of Equation 8 the Lagrange Multipliers ($\lambda$) are unknown, and as discussed above, v represents weights corresponding to the control group dataset, and w represents weights corresponding to the treatment group dataset. For example, assuming three subjects in the control group dataset and two in the treatment group dataset, the weighting engine 110 balances the weights across two covariates. The labels of the covariates shown in example Table 1 are arbitrary and small numbers used only for illustration.

TABLE 1

| | Treated | | Control | |
|---|---|---|---|---|
| Index | Covariates | Outcome (Y1) | Covariates | Outcome (Y0) |
| 1 | [4, 8] | 7 | [2, 3] | 2 |
| 2 | [7, 1] | 5 | [8, 5] | 4 |
| 3 | | | [4, 1] | 1 |

To solve for the Lagrange Multipliers ($\lambda$), the weighting engine 110 maximizes Equation 7 subject to the following example constraint matrix shown in example Equation 9.

$$\begin{bmatrix} 1 & 1 & 0 & 0 & 0 \\ 0 & 0 & 1 & 1 & 1 \\ 4 & 7 & -2 & -8 & -4 \\ 8 & 1 & -3 & -5 & -1 \end{bmatrix} \begin{bmatrix} p_1 \\ p_2 \\ p_3 \\ p_4 \\ p_5 \end{bmatrix} = \begin{bmatrix} 1 \\ 1 \\ 0 \\ 0 \end{bmatrix}$$

Equation 9

In the illustrated example of Equation 9, elements ($p_1$, $p_2$) map to the treatment group dataset weights ($v_1$, $v_1$), and elements ($p_3$, $p_4$, $p_5$) map to the control group dataset weights ($w_1$, $w_3$, $w_3$). The analysis engine 102 inputs the resulting variables into Equation 8 in a manner consistent with example Equation 10.

$v_1 = \exp(\lambda_0^{(1)}(1) + (\lambda_1)4 + (\lambda_2)8)$ $v_2 = \exp(\lambda_0^{(1)}(1) + (\lambda_1)7 + (\lambda_2)1)$ $w_1 = \exp(\lambda_0^{(0)}(1) + (-\lambda_1)2 + (-\lambda_2)3)$ $w_2 = \exp(\lambda_0^{(0)}(1) + (-\lambda_1)8 + (-\lambda_2)5)$ $w_3 = \exp(\lambda_0^{(0)}(1) + (-\lambda_1)4 + (-\lambda_2)1)$ The example weighting engine 110 solves Equation 10 to determine the Lagrange Multipliers. The example weighting engine 110 substitutes the resulting Lagrange Multipliers into Equation 10 to produce the resulting weighted covariates in a manner consistent with example Equation 11. As such, the weighted covariates for the control group dataset are equal to the weighted covariates for the treatment group dataset.

$v_1 = 0.3861$
$v_2 = 0.6139$
$w_1 = 0.2152$
$w_2 = 0.5680$
$w_3 = 0.2168$

Equation 11

The example weighting response engine 112 inputs the resulting weights for the treatment and control group datasets into Equation 6 to determine the Average Treatment Effect in a manner consistent with Equation 12.

$$\hat{\gamma}_{ATE} = \sum_{Z_i=1} v_i Y_i - \sum_{Z_i=0} w_i Y_i = ((0.3861)(7) + (0.6139)(5)) -$$

$$((0.2152)(2) + (0.5680)(4) +$$

$$(0.2168)(1))$$

$$= 5.7722 - 2.9193$$

$$= 2.8528$$

Equation 2

As such, the resulting ATE of 2.8528 represents a potential increase of $2.8528 for viewing an advertisement of interest.

Examples disclosed herein utilize the same principle to balance covariates simultaneously across multiple treatment group dataset levels. In the section above, the analysis engine 102 symbolically constrains A−B=0, where A and B represent weighted covariates among the treatment group dataset and control group dataset, and the difference must be zero and therefore A=B. To incorporate a third group (e.g., group C) the analysis engine 102 adds another set of constraints relating group B with group C, such that B−C=0. As such, A=B and B=C, and by transitive relation of equality A=C, A=B=C.

The example covariate engine 108 can therefore solve for multiple groups by linking each new group with the previous, A−B=0, B−C=0, C−D=0, D−E=0, etc.

For example, example Table 2 represents a control group dataset and two treatment group dataset levels.

TABLE 2

| | Second Level Treatment | |
|---|---|---|
| index | Covariates | Outcome ($Y^2$) |
| 1 | [10, 9] | 9 |
| 2 | [1, 1] | 5 |
| 3 | [8, 4] | 10 |
| 4 | [9, 3] | 2 |

| | First Level Treatment | |
|---|---|---|
| index | Covariates | Outcome ($Y^1$) |
| 1 | [4, 8] | 7 |
| 2 | [7, 1] | 5 |

| | Control | |
|---|---|---|
| index | Covariates | Outcome ($Y^0$) |
| 1 | [2, 3] | 2 |
| 2 | [8, 5] | 4 |
| 3 | [4, 1] | 1 |

The example weighting engine 110 maximizes entropy value (H) subject to particular linear constraints, similar to Equation 7 above. In some examples, the weighting engine 110 maximizes an entropy value in a manner consistent with Equation 13 when multiple groups (e.g., two treatment group dataset levels and three control group dataset levels, 4 treatment group dataset level and 1 control group dataset, etc.) are being analyzed.

Maximize $p$  Equation 13

$$H = -\sum_{i=1}^{n_2+n_1+n_0} p_i \log(p_i)$$

Subject to $$\sum_{i=1}^{n_2} p_i = 1$$

$$\sum_{i=n_2+1}^{n_2+n_1} p_i = 1$$

$$\sum_{i=n_2+n_1+1}^{n_2+n_1+n_0} p_i = 1$$

$$\sum_{Z_i=2} p_i c_j(X_i) - \sum_{Z_i=1} p_i c_j(X_i) = 0 \quad j = 1, \ldots, m$$

$$\sum_{Z_i=1} p_i c_j(X_i) - \sum_{Z_i=0} p_i c_j(X_i) = 0 \quad j = 1, \ldots, m$$

$$\left(\sum_{Z_i=0} p_i c_j(X_i) - \sum_{Z_i=2} p_i c_j(X_i) = 0 \quad j = 1, \ldots, m\right)$$

In the illustrated example of Equation 13, the last group of equality constraints are not logically needed, but are incorporated for purposes of illustration. The weighting engine 110 maximizes Equation 13 subject to the following constraint matrix in example Equation 14.

$$\begin{bmatrix} 1 & 1 & 1 & 1 & 0 & 0 & 0 & 0 & 0 \\ 0 & 0 & 0 & 0 & 1 & 1 & 0 & 0 & 0 \\ 0 & 0 & 0 & 0 & 0 & 0 & 1 & 1 & 1 \\ 10 & 1 & 8 & 9 & -4 & -7 & 0 & 0 & 0 \\ 9 & 1 & 4 & 3 & -8 & -1 & 0 & 0 & 0 \\ 0 & 0 & 0 & 0 & 4 & 7 & -2 & -8 & -4 \\ 0 & 0 & 0 & 0 & 8 & 1 & -3 & -5 & -1 \\ -10 & -1 & -8 & -9 & 0 & 0 & 2 & 8 & 4 \\ -9 & -1 & -4 & -3 & 0 & 0 & 3 & 5 & 1 \end{bmatrix} \begin{bmatrix} p_1 \\ p_2 \\ p_2 \\ p_4 \\ p_5 \\ p_6 \\ p_7 \\ p_8 \\ p_9 \end{bmatrix} = \begin{bmatrix} 1 \\ 1 \\ 1 \\ 0 \\ 0 \\ 0 \\ 0 \\ 0 \\ 0 \end{bmatrix} \quad \text{Equation 14}$$

In the illustrated example of Equation 14, elements ($p_1$, $p_2$, $p_3$, $p_4$) map to the second level treatment group dataset weights ($w_1^{(2)} w_2^{(2)} w_3^{(2)} w_4^{(2)}$), elements ($p_5$, $p_6$) map to the first level treatment group dataset weights ($w_1^{(1)} w_2^{(1)}$), and elements ($p_7$, $p_8$, $p_9$) map to the control group dataset weights ($w_1^{(0)} w_2^{(0)} w_3^{(0)}$). The example weighting engine 110 subsequently maps each constraint with a Lagrange Multiplier, as illustrated in example Equation 15.

$$\begin{bmatrix} 1 & 1 & 1 & 1 & 0 & 0 & 0 & 0 & 0 \\ 0 & 0 & 0 & 0 & 1 & 1 & 0 & 0 & 0 \\ 0 & 0 & 0 & 0 & 0 & 0 & 1 & 1 & 1 \\ 10 & 1 & 8 & 9 & -4 & -7 & 0 & 0 & 0 \\ 9 & 1 & 4 & 3 & -8 & -1 & 0 & 0 & 0 \\ 0 & 0 & 0 & 0 & 4 & 7 & -2 & -8 & -4 \\ 0 & 0 & 0 & 0 & 8 & 1 & -3 & -5 & -1 \\ -10 & -1 & -8 & -9 & 0 & 0 & 2 & 8 & 4 \\ -9 & -1 & -4 & -3 & 0 & 0 & 3 & 5 & 1 \end{bmatrix} \Rightarrow \begin{bmatrix} \lambda_0^{(2)} \\ \lambda_0^{(1)} \\ \lambda_0^{(0)} \\ \lambda_1^{(2)} \\ \lambda_2^{(2)} \\ \lambda_1^{(1)} \\ \lambda_2^{(1)} \\ \lambda_1^{(0)} \\ \lambda_2^{(0)} \end{bmatrix} \quad \text{Equation 15}$$

The weighting engine 110 solves Equation 15 to determine the resulting weighted covariates. The example weighting engine 110 substitutes Lagrange Multipliers into Equation 8 to produce the resulting weighted covariates in a manner consistent with example Equation 16.

$$w_1^{(2)} = \exp(\lambda_0^{(2)}(1) + (\lambda_1^{(2)} - \lambda_1^{(0)})(10) + (\lambda_2^{(2)} - \lambda_2^{(0)})(9)) \quad \text{Equation 16}$$

$$w_2^{(2)} = \exp(\lambda_0^{(2)}(1) + (\lambda_1^{(2)} - \lambda_1^{(0)})(1) + (\lambda_2^{(2)} - \lambda_2^{(0)})(1))$$

$$w_3^{(2)} = \exp(\lambda_0^{(2)}(1) + (\lambda_1^{(2)} - \lambda_1^{(0)})(8) + (\lambda_2^{(2)} - \lambda_2^{(0)})(4))$$

$$w_4^{(2)} = \exp(\lambda_0^{(2)}(1) + (\lambda_1^{(2)} - \lambda_1^{(0)})(9) + (\lambda_2^{(2)} - \lambda_2^{(0)})(3))$$

$$w_1^{(1)} = \exp(\lambda_0^{(1)}(1) + (\lambda_1^{(1)} - \lambda_1^{(2)})(4) + (\lambda_2^{(1)} - \lambda_2^{(2)})(8))$$

$$w_2^{(1)} = \exp(\lambda_0^{(1)}(1) + (\lambda_1^{(1)} - \lambda_1^{(2)})(7) + (\lambda_2^{(1)} - \lambda_2^{(2)})(1))$$

$$w_1^{(0)} = \exp(\lambda_0^{(0)}(1) + (\lambda_1^{(0)} - \lambda_1^{(1)})(2) + (\lambda_2^{(0)} - \lambda_2^{(1)})(3))$$

$$w_2^{(0)} = \exp(\lambda_0^{(0)}(1) + (\lambda_1^{(0)} - \lambda_1^{(1)})(8) + (\lambda_2^{(0)} - \lambda_2^{(1)})(5))$$

$$w_3^{(0)} = \exp(\lambda_0^{(0)}(1) + (\lambda_1^{(0)} - \lambda_1^{(1)})(4) + (\lambda_2^{(0)} - \lambda_2^{(1)})(1))$$

The example weighting engine 110 solves Equation 16 to determine the Lagrange Multipliers: $\lambda_0^{(2)} = -0.8701$, $\lambda_0^{(1)} = 0.0003$, $\lambda_0^{(0)} = -2.1164$, $\lambda_1^{(2)} = -0.0141$, $\lambda_2^{(2)} = 0.0406$, $\lambda_1^{(1)} = -0.0690$, $\lambda_2^{(1)} = -0.0531$, $\lambda_1^{(0)} = 0.0831$, $\lambda_2^{(0)} = 0.0126$. The example weighting engine 110 substitutes the resulting Lagrange Multipliers into Equation 16 to produce the resulting weighted covariates in a manner consistent with example Equation 17. As such, the weighted covariates for all three groups are now equal to each other.

$$w_1^{(2)} = 0.2039$$
$$w_2^{(2)} = 0.3909$$
$$w_3^{(2)} = 0.2153$$
$$w_4^{(2)} = 0.1899$$
$$w_1^{(1)} = 0.3795$$
$$w_2^{(1)} = 0.6205$$
$$w_1^{(0)} = 0.1989$$
$$w_2^{(0)} = 0.5648$$
$$w_3^{(0)} = 0.2364$$

Equation 17

The example weighting response engine 112 inputs the resulting weights for the second treatment group datasets into Equation 18 to determine the ATE for the second treatment group dataset, and inputs the resulting weights for the first treatment group dataset into Equation 19 to determine the ATE for the first treatment group dataset.

$$\hat{\gamma}_{ATE}^{(2)} = \sum_{Z_i=2} w_i^{(2)} Y_i^{(2)} - \sum_{Z_i=0} w_i^{(0)} Y_i^{(0)} = 6.3222 - 2.8932 = 3.4290 \quad \text{Equation 18}$$

$$\hat{\gamma}_{ATE}^{(1)} = \sum_{Z_i=1} w_i^{(1)} Y_i^{(1)} - \sum_{Z_i=0} w_i^{(0)} Y_i^{(0)} = 5.7591 - 2.8932 = 2.8659 \quad \text{Equation 19}$$

As such, the resulting ATE of 3.4290 for the second treatment group represents a potential increase of $3.4290 for viewing the advertisement of the second control group dataset, and the resulting ATE of 2.8659 for the first treatment group dataset represents a potential increase of $2.8659 for viewing the advertisement of the first control group dataset. Thus, the report generator 114 may generate a report indicating the resulting potential increases for each advertisement.

In some examples, assuming K groups, k=1, . . . , K, with each group having $n_k$ individuals, i=1, . . . , $n_k$. Additionally, there are J covariates to balance across all K groups (e.g., these may be first moments, second moments, or any other combination). As used herein, "moments" refer to covariates (e.g., demographic characteristics) of individuals in a group dataset, where the nth moment indicates the covariate taken to the nth power (e.g., first moment represented by c(x)=x, second moment represented by c(x)=$x^2$. As such, the post-weighted zero moments sum to 100%, and the post-weighted first moments are utilized for covariate balancing (e.g., weighted average) as disclosed herein. In some examples, the second moment may have a square of the covariates that are also balanced. This is beneficial as the balancing of both the first moments and the second moments results in weighted means that sum to 100%, and variances that sum to 100%. The example weighting engine 110 does not specify what the weighted covariate should be, but maximizes an entropy value (H) subject to particular linear constraints in a manner consistent with Equation 20

$$\text{Maximize } H = \sum_{k+1}^{K} \left( -\sum_{i=1}^{n_k} w_i^{(k)} \log(w_i^{(k)}) \right) \quad \text{Equation 20}$$

Subject to the following constraints $$\sum_{i=1}^{n_k} w_i^{(k)} = 1 \; \forall \, k = 1, \ldots, K$$

-continued $$\sum_{i=1}^{n_1} w_i^{(1)} c_j(X_{(i,j)}) = \ldots = \sum_{i=1}^{n_K} w_i^{(K)} c_j(X_{(i,j)}) \; \forall \, j = 1, \ldots, J$$

In the illustrated example of Equation 20, the first constraint indicates maximizing the total entropy across all probability distributions among the K groups; the second constraint indicates that the weights for each group must sum to 100%; and the third constraint indicates the weighted jth covariate across all members for each group (i=1, . . . , $n_k$) must all be equal to each other. The function $c_j(X)$ is up to an analyst and could be a first moment ($c_j(X)=X$), a second moment ($c_j(X)=X^2$), or other functions. In some examples, the functions to balance may be determined by a user. For example, balance weighted averages (as disclosed herein), or use "other functions" such as alternatively or in addition to balancing first-moments to also balancing second-moments; or doing apples-to-apples balancing for each category for categorical variables (i.e., you can't have weighted average of a categorical variable). In some examples, the weighting engine 110 balances real-valued numbers matching the weighted averages (as disclosed herein), and also balances their variance (matching both first and second moments). However, if categorical variables (apples, oranges, etc.) which have no numerical values are present, the weighting engine 110 utilizes "other functions," which in this example matches apples to apples and oranges to oranges. As such, the weighted probabilities for each individual category match between treatment group dataset and control group dataset.

In some examples, the formula for $W_i^{(k)}$ has a closed form expression consistent with Equation 21.

$$w_i^{(k)} = \exp\left( \delta_0^{(k)} + \sum_{j=1}^{J} \delta_j^{(k)} c_j(X_{(i,j)}) \right) \quad \text{Equation 21}$$

Where $\delta_j^{(k)}$ is expressed in a cyclic manner from the original Lagrange Multipliers ($\lambda_j^{(k)}$), as discussed above in connection with Equations 10-19, in a manner consistent with Equation 22.

$$\delta_j^{(k)} = \begin{cases} \lambda_0^{(k)} & j = 0 \\ \lambda_j^{(k)} - \lambda_j^{(K)} & j \neq 0, k = 1 \\ \lambda_j^{(k)} - \lambda_j^{(k-1)} & j \neq 0, k \neq 1 \end{cases} \quad \text{Equation 22}$$

For example, let there be J=2 covariates to match among K=3 groups. The index of j=0 is always reserved for the normalization constraint, as shown below.

| k | 0 | 1 | 2 |
|---|---|---|---|
| 1 | $\lambda_0^{(1)}$ | $(\lambda_1^{(1)} - \lambda_1^{(3)})$ | $(\lambda_2^{(1)} - \lambda_2^{(3)})$ |
| 2 | $\lambda_0^{(2)}$ | $(\lambda_1^{(2)} - \lambda_1^{(1)})$ | $(\lambda_2^{(2)} - \lambda_2^{(1)})$ |
| 3 | $\lambda_0^{(3)}$ | $(\lambda_1^{(3)} - \lambda_1^{(2)})$ | $(\lambda_2^{(2)} - \lambda_2^{(1)})$ |

The values for any particular row (1, 2, 3) are the same multipliers used in (Equation 21). Also, for any column (0, 1, 2) the sum is algebraically zero as rearranging terms have each multiplier subtracted from itself. As such, the weighting engine 110 represents this in a manner consistent with Equation 23.

$$\sum_{k=1}^{K} \delta_j^{(k)} = 0 \; \forall \; j = 1, \ldots, J \qquad \text{Equation 23}$$

This means without loss of generality the weighting engine 110 can set $\lambda_j^{(k)}=0$ for all j. This reduces the number of Lagrange Multipliers in (Equation 22) from K(J+1) to K(J+1)−J. The fundamental reason for this is that for any particular covariate where a=b and b=c, the weighting engine 110 does not have to specify that c should equal a, it is automatically satisfied by the transitive relation of equality. This reduces the number of constraints, and therefore Lagrange Multipliers, by one, which in return improves the operational efficiency of the operating system. As this is true for each covariate, a resulting reduction of J constraints are satisfied.

In some examples, if the same covariates are used within a propensity score as is with the weighting described above in connection with Equations 5-19, the weighted multinomial propensity score would equal 1/K for each individual (i).

In a similar manner, if the ith individual in the kth group has a potential outcome of $Y_i^{(k)}$ the weighting engine 110 determines causal differences $(\hat{\gamma})$ between two different groups (k1, k2) in a manner consistent with Equation 24.

$$\hat{\gamma}^{([k_1 - k_2])} = \left( \sum_{i=1}^{n_{k_1}} w_i^{(k_1)} Y_i^{(k_1)} \right) - \left( \sum_{i=1}^{n_{k_2}} w_i^{(k_2)} Y_i^{(k_2)} \right) \qquad \text{Equation 24}$$

In the illustrated examples of (Equation 21) and (Equation 23), the weighting engine 110 solves for $\delta_j^{(k)}$ directly, without any reference to the original $\lambda_j^{(k)}$ which the $\delta$ defined. Both the $\lambda$ and the $\delta$ act as Lagrange Multipliers. The difference is that the formulation using the $\delta$ automatically takes into account the circular equalities (A−B=0, B−C=0, etc.). This is illustrated in (Equation 23) stating that for each covariate the sum of the $\delta$ for the covariate must be zero across all groups. As such, one of them can be defined as the negative sum of the other values.

As such, the weighting engine 110 is capable of filtering out redundant variables which are known functions of other variables. In some examples, if K groups are to be balanced with J covariates, there are (K−1)J unknown variables which must be solved, independent of the number of individuals in each group.

In the illustrated example of Equation 25, the weighting engine 110 removes the $\delta_0$ factor from Equation 21, and arbitrarily assigned last group k=K to have their values equal the negative sum of the others to ensure that (Equation 23) is satisfied.

$$\tilde{w}_i^{(k)} = \begin{cases} \exp\left( \sum_{j=1}^{J} \delta_j^{(k)} c_j(X_{(i,j)}) \right) & k = 1, \ldots, K-1 \\ \exp\left( \sum_{j=1}^{J} \left( -\sum_{m=1}^{K-1} \delta_j^{(m)} \right) c_j(X_{(i,j)}) \right) & k = K \end{cases} \qquad \text{Equation 25}$$

In the illustrated example of Equation 25 the (~) represents the un-normalized state. For example, an un-normalized weight ($\tilde{w}_i$) equaling [1 2 1] which has a sum=4 would result in a normalized weight (w) equaling [0.25 0.5 0.25], after the normalization processes described in more detail below. The weighting engine 110 normalizes each weight, depending on how many weights are in each group in a manner consistent with Equation 26.

$$w_i^{(k)} = \frac{\tilde{w}_i^{(k)}}{\sum_{i=1}^{n_k} \tilde{w}_i^{(k)}} \qquad \text{Equation 26}$$

The example weighting engine 110 determines an equality structure by solving the equations represented in Equation 27.

$$\sum_{i=1}^{n_1} w_i^{(1)} c_j(X_{(i,j)}) = \sum_{i=1}^{n_2} w_i^{(2)} c_j(X_{(i,j)}) \qquad \text{Equation 27}$$

$$\sum_{i=1}^{n_2} w_i^{(2)} c_j(X_{(i,j)}) = \sum_{i=1}^{n_3} w_i^{(3)} c_j(X_{(i,j)})$$

$$\vdots$$

$$\sum_{i=1}^{n_{(K-1)}} w_i^{(1)} c_j(X_{(i,j)}) = \sum_{i=1}^{n_K} w_i^{(K)} c_j(X_{(i,j)})$$

The equations in Equation 27 represents that for covariate j all K treatment group datasets must have the same weighted average (A=B, B=C, C=D, etc). Additionally, the same equality structure must hold for all other covariates.

For example, the weighting engine 110 may receive the following three sets of data from the covariate engine 108 representing three different groups of individuals exposed to three different advertisements.

| | Third Group | |
|---|---|---|
| index | Covariates | Outcome ($Y^3$) |
| 1 | [10, 9] | 9 |
| 2 | [1, 1] | 5 |
| 3 | [8, 4] | 10 |
| 4 | [9, 3] | 2 |

| | Second Group | |
|---|---|---|
| index | Covariates | Outcome ($Y^2$) |
| 1 | [4, 8] | 7 |
| 2 | [7, 1] | 5 |

| | First Group | |
|---|---|---|
| index | Covariates | Outcome ($Y^1$) |
| 1 | [2, 3] | 2 |
| 2 | [8, 5] | 4 |
| 3 | [4, 1] | 1 |

In the above datasets, there are K=3 groups with J=2 covariates to balance. As such, the weighting engine 110 must have (K−1)J=4 unknown variables to solve for, which as a result of (Equation 25) are $\delta_1^{(1)} \delta_2^{(1)} \delta_1^{(2)} \delta_2^{(2)}$. The weighting engine 110 solves for Equation 25 in a manner consistent with Equation 28.

$$\tilde{w}_1^{(1)} = \exp\left(\delta_1^{(1)}(2) + \delta_2^{(1)}(3)\right)$$
$$\tilde{w}_2^{(1)} = \exp\left(\delta_1^{(1)}(8) + \delta_2^{(1)}(5)\right)$$
$$\tilde{w}_3^{(1)} = \exp\left(\delta_1^{(1)}(4) + \delta_2^{(1)}(1)\right)$$
$$\tilde{w}_1^{(2)} = \exp\left(\delta_1^{(2)}(4) + \delta_2^{(2)}(8)\right)$$
$$\tilde{w}_2^{(2)} = \exp\left(\delta_1^{(2)}(7) + \delta_2^{(2)}(1)\right)$$
$$\tilde{w}_1^{(3)} = \exp\left(-(\delta_1^{(1)} + \delta_1^{(2)})(10) + -(\delta_2^{(1)} + \delta_2^{(2)})(9)\right)$$
$$\tilde{w}_2^{(3)} = \exp\left(-(\delta_1^{(1)} + \delta_1^{(2)})(1) + -(\delta_2^{(1)} + \delta_2^{(2)})(1)\right)$$
$$\tilde{w}_3^{(3)} = \exp\left(-(\delta_1^{(1)} + \delta_1^{(2)})(8) \pm (\delta_2^{(1)} + \delta_2^{(2)})(4)\right)$$
$$\tilde{w}_4^{(3)} = \exp\left(-(\delta_1^{(1)} + \delta_1^{(2)})(9) + -(\delta_2^{(1)} + \delta_2^{(2)})(3)\right)$$

Equation 28

The last of the expressions is stating that the unknown coefficient is the negative of the sum of the other coefficients for that covariate. This is identical to the (Equation 23) constraint.

The weighting engine 110 calculates the normalized weights in a manner consistent with Equation 29, subject to the constraints of Equation 30.

$$w_1^{(1)} = \tilde{w}_1^{(1)}/(\tilde{w}_1^{(1)} + \tilde{w}_2^{(1)} + \tilde{w}_3^{(1)})$$
$$w_2^{(1)} = \tilde{w}_2^{(1)}/(\tilde{w}_1^{(1)} + \tilde{w}_2^{(1)} + \tilde{w}_3^{(1)})$$
$$w_3^{(1)} = \tilde{w}_3^{(1)}/(\tilde{w}_1^{(1)} + \tilde{w}_2^{(1)} + \tilde{w}_3^{(1)})$$
$$w_1^{(2)} = \tilde{w}_1^{(2)}/(\tilde{w}_1^{(2)} + \tilde{w}_2^{(2)})$$
$$w_2^{(2)} = \tilde{w}_2^{(2)}/(\tilde{w}_1^{(2)} + \tilde{w}_2^{(2)})$$
$$w_1^{(3)} = \tilde{w}_1^{(3)}/(\tilde{w}_1^{(3)} + \tilde{w}_2^{(3)} + \tilde{w}_3^{(3)} + \tilde{w}_4^{(3)})$$
$$w_2^{(3)} = \tilde{w}_2^{(3)}/(\tilde{w}_1^{(3)} + \tilde{w}_2^{(3)} + \tilde{w}_3^{(3)} + \tilde{w}_4^{(3)})$$
$$w_3^{(3)} = \tilde{w}_3^{(3)}/(\tilde{w}_1^{(3)} + \tilde{w}_2^{(3)} + \tilde{w}_3^{(3)} + \tilde{w}_4^{(3)})$$
$$w_4^{(3)} = \tilde{w}_4^{(3)}/(\tilde{w}_1^{(3)} + \tilde{w}_2^{(3)} + \tilde{w}_3^{(3)} + \tilde{w}_4^{(3)})$$

Equation 29

The constraints that must be satisfied are illustrated in Equation 30.

$(w_1^{(1)})(2)+(w_2^{(1)})(8)+(w_3^{(1)})(4)=(w_1^{(2)})(4)+(w_2^{(2)})(7)$ $(w_1^{(2)})(4)+(w_2^{(2)})(7)=(w_1^{(3)})(10)+(w_2^{(3)})(1)+(w_3^{(3)})(8)+(w_4^{(3)})(9)$ $(w_1^{(1)})(3)+(w_2^{(1)})(5)+(w_3^{(1)})(1)=(w_1^{(2)})(8)+(w_2^{(2)})(1)$ $(w_1^{(2)})(8)+(w_2^{(2)})(1)=(w_1^{(3)})(9)+(w_2^{(3)})(1)+(w_3^{(3)})(4)+(w_4^{(3)})(3)$

Equation 30

In the illustrated example of Equation 30, each equation represents the following: 1) Weighted average of the first covariate in group 1 must equal the weighted average of the first covariate in group 2; 2) Weighted average of the first covariate in group 2 must equal the weighted average of the first covariate in group 3; 3) Weighted average of the second covariate in group 1 must equal the weighted average of the second covariate in group 2; 4) Weighted average of the second covariate in group 2 must equal the weighted average of the second covariate in group 3

As such, there are four equations in four unknowns $\delta_1^{(1)}\delta_2^{(1)}\delta_1^{(2)}\delta_2^{(2)}$, which the weighting engine 110 solves for utilizing any non-linear multivariate solver, resulting in Equation 31.

$\delta_1^{(1)}=+0.152074$ $\delta_2^{(1)}=+0.0656848$ $\delta_1^{(2)}=-0.0548394$ $\delta_2^{(2)}=-0.0937144$ Equation 31:

The weighting engine 110 inputs the results from Equation 30 into (Equation 28) to determine the un-normalized weights in a manner consistent with Equation 32.

$\tilde{w}_1^{(1)} = 1.65071$
$\tilde{w}_2^{(1)} = 4.68807$
$\tilde{w}_3^{(1)} = 1.96204$
$\tilde{w}_1^{(2)} = 0.379435$
$\tilde{w}_2^{(2)} = 0.620276$
$\tilde{w}_1^{(3)} = 0.486711$
$\tilde{w}_2^{(3)} = 0.933135$
$\tilde{w}_3^{(3)} = 0.513881$
$\tilde{w}_4^{(3)} = 0.453379$ Equation 32

The weighting engine 110 determines the normalized set of weights by inputting the results of Equation 32 into Equation 26 to produce results in a manner consistent with Equation 33.

$w_1^{(1)} = 0.198861$
$w_2^{(1)} = 0.564772$
$w_3^{(1)} = 0.236367$
$w_1^{(2)} = 0.379435$
$w_2^{(2)} = 0.620276$
$w_1^{(3)} = 0.203892$
$w_2^{(3)} = 0.390906$
$w_3^{(3)} = 0.215274$
$w_4^{(3)} = 0.189928$

Equation 33

The weighting response engine 112 determines the resulting causal effect (e.g., estimated average outcomes ($\overline{Y}_W$)) in a manner consistent with Equation 34 (e.g., in a manner consistent with Equations 18 and 19).

$\overline{Y}_W^{(1)}=2.89318$ $\overline{Y}_W^{(2)}=5.75909$ $\overline{Y}_W^{(3)}=6.32215$ Equation 34:

The resulting estimated average outcomes are the estimated average outcomes for each treatment (e.g., advertisement campaign) as if the observed individuals (e.g., individuals in the treatment group dataset) actually were in a randomized experiment. As such, the weighting response engine 112 determines the net positive or negative difference across different treatments. For example, if the estimated average outcomes were dollar purchases and treatment 1 (e.g., advertisement 1) corresponds to "control" and treatment 2 (e.g., advertisement 2) correspond to television advertising, the weighting response engine 112 would calculate a $2.86 (5.75-2.89) increase in purchases by an individual viewing the television advertisement as opposed to not viewing the advertisement at all (e.g., control). In some examples, treatment 3 (e.g., advertisement 3) could be an internet advertisement. As such, combinations of treatments can also be estimated by the weighting response engine 112. For example, if treatment (1)=None, treatment (2)=TV only advertisement, treatment (3)=Internet only advertisement, and treatment (4)=Both TV and Internet advertisement, the weighting response engine 112 estimates the causal effect of seeing advertisements from one or another, and/or a combined effect of seeing an advertisement on multiple devices. This is beneficial because it allows advertisers to determine which combination among multiple platforms produce the most impact, and allows advertisers to adjust their advertising strategies accordingly taking into account budgetary and business decisions.

In some examples, when the treatment/control data stores(s) 104 include design weights (d) (e.g., sampling weights), the analysis engine 102 substitutes the following equations into the processes disclosed above in connection with Equations 1-34. For example, the analysis engine 102 substitutes Equation 1a for Equation 1, Equation 3a for Equation 3, Equation 5a for Equation 5, Equation 7a for Equation 7, Equation 8a for Equation 8, Equation 13a for Equation 13, Equation 20a for Equation 20, Equation 21a for Equation 21, and Equation 25a for Equation 25. As such, the analysis engine 102 determines causal effects for treatment group datasets and control group datasets that include design weights (d) in a manner consistent with Equations 1a, 3a, 5a, 7a, 8a, 13a, 20a, 21a, and 25a while maintaining the efficiencies and operation of the analysis engine 102 disclosed above in connection with Equations 1-34. That is, Equations 1a, 3a, 5a, 7a, 8a, 13a, 20a, 21a, and 25a are substituted into the above disclosure of Equations 1-34 to accommodate the design weights (d) of the treatment group datasets and the control group datasets.

$$H = -\sum_{Z_i=0} w_i \log\left(\frac{w_i}{d_i}\right)$$ Equation 1a $$H = -\sum_{Z_i=1} v_i \log\left(\frac{v_i}{d_i}\right)$$ Equation 3a $$H = \left(-\sum_{Z_i=1} v_i \log\left(\frac{v_i}{d_i}\right)\right) + \left(-\sum_{Z_i=0} w_i \log\left(\frac{w_i}{d_i}\right)\right)$$ Equation 5a $$H = -\sum_{i=1}^{n_1+n_0} p_i \log\left(\frac{p_i}{d_i}\right)$$ Equation 7a $$v_i = d_i \exp\left(\lambda_0^{(1)} + \sum_{j=1}^m \lambda_j c_j(x_i)\right)$$ Equation 8a $$w_i = d_i \exp\left(\lambda_0^{(0)} + \sum_{j=1}^m (-\lambda_j) c_j(x_i)\right)$$

$$H = -\sum_{i=1}^{n_2+n_1+n_0} p_i \log\left(\frac{p_i}{d_i}\right)$$ Equation 13a $$KL = \sum_{k=1}^K \left(\sum_{i=1}^{n_k} w_i^{(k)} \log\left(\frac{w_i^{(k)}}{d_i^{(k)}}\right)\right)$$ Equation 20a $$w_i^{(k)} = d_i^{(k)} \exp\left(\delta_0^{(k)} + \sum_{j=1}^J \delta_j^{(k)} c_j(X_{(i,j)})\right)$$ Equation 21a Equation 25a $$\tilde{w}_i^{(k)} =$$

$$\begin{cases} d_i^{(k)} \exp\left(\sum_{j=1}^J \delta_j^{(k)} c_j(X_{(i,j)})\right) & k = 1, \ldots, K-1 \\ d_i^{(k)} \exp\left(\sum_{j=1}^J \left(-\sum_{m=1}^{K-1} \delta_j^{(m)}\right) c_j(X_{(i,j)})\right) & k = K \end{cases}$$

While an example manner of implementing example environment in accordance with the teachings of this disclosure is illustrated in FIG. 1, one or more of the elements, processes and/or devices illustrated in FIG. 1 may be combined, divided, re-arranged, omitted, eliminated and/or implemented in any other way. Further, the example treatment/control data interface 106, the example covariate engine 108, the example weighting engine 110, the example weighting response engine 112, the example report generator 114, and/or, more generally, the example analysis engine 102 of FIG. 1 may be implemented by hardware, software, firmware and/or any combination of hardware, software and/or firmware. Thus, for example, any of the example treatment/control data interface 106, the example covariate engine 108, the example weighting engine 110, the example weighting response engine 112, the example report generator 114, and/or, more generally, the example analysis engine 102 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example treatment/control data interface 106, the example covariate engine 108, the example weighting engine 110, the example weighting response engine 112, the example report generator 114, and/or, more generally, the example analysis engine 102 of FIG. 1 is/are hereby expressly defined to include a non-transitory computer readable storage device or storage disk such as a memory, a digital versatile disk (DVD), a compact disk (CD), a Blu-ray disk, etc. including the software and/or firmware. Further still, the example environment 100 and/or the example analysis engine 102 may include one or more elements, processes and/or devices in addition to, or instead of, those illustrated in FIG. 1, and/or may include more than one of any or all of the illustrated elements, processes and devices.

Flowcharts representative of example machine readable instructions for implementing the example treatment/control data interface 106, the example covariate engine 108, the example weighting engine 110, the example weighting response engine 112, the example report generator 114, and/or, more generally, the example analysis engine 102 of FIG. 1 are shown in FIGS. 2-5. In these examples, the machine readable instructions comprise one or more programs for execution by a processor, such as the processor 612 shown in the example processor platform 600 discussed below in connection with FIG. 6. The one or more programs, or portion(s) thereof, may be embodied in software stored on a non-transitory computer readable storage medium such as a CD-ROM, a floppy disk, a hard drive, a digital versatile disk (DVD), a Blu-ray disk™, or a memory associated with the processor 612, but the entire program or programs and/or parts thereof could alternatively be executed by a device other than the processor 612 and/or embodied in firmware or dedicated hardware (e.g., implemented by an ASIC, a PLD, an FPLD, discrete logic, etc.). Further, although the example program(s) is(are) described with reference to the flowcharts illustrated in FIGS. 2-5, many other methods of implementing the example treatment/control data interface 106, the example covariate engine 108, the example weighting engine 110, the example weighting response engine 112, the example report generator 114, and/or, more generally, the example analysis engine 102 of FIG. 1 may alternatively be used. For example, with reference to the flowcharts illustrated in FIGS. 2-5, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 2-5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended. Also, as used herein, the terms "computer readable" and "machine readable" are considered equivalent unless indicated otherwise.

Figure 2:
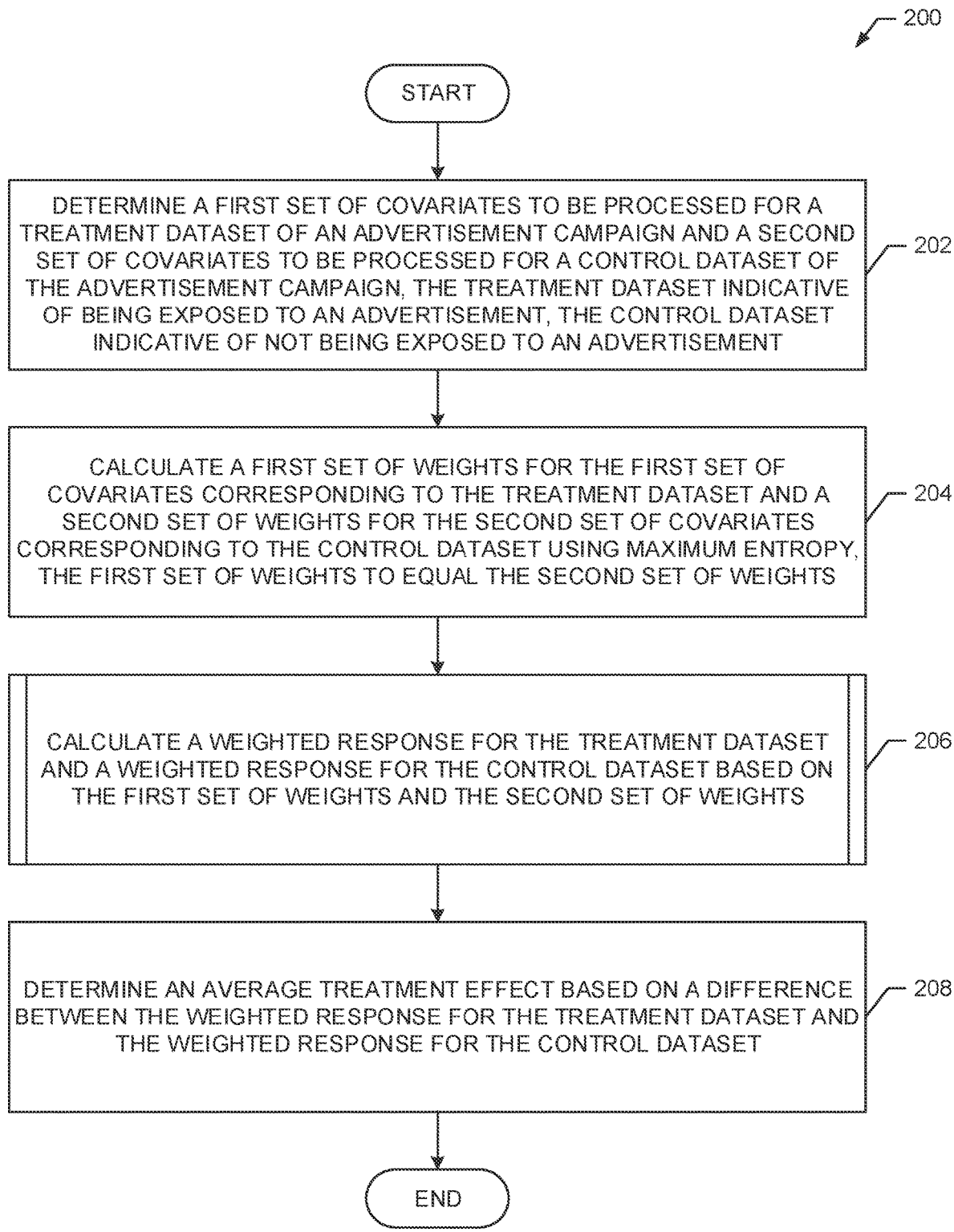
FIGS. 2-5 are flowcharts representative of example machine readable instructions that may be executed to implement the example analysis engine of FIG. 1.

An example program 200 that may be executed in the example environment 100 of FIG. 1 to leverage the analysis engine 102 to determine causal effects for audience measurement is illustrated in FIG. 2. In the illustrated example of FIG. 2, the example covariate engine 108 determines a first set of covariates to be processed for a treatment group dataset of an advertisement campaign and a second set of covariates to be processed for a control group dataset of the advertisement campaign, the treatment group dataset is indicative of being exposed to an advertisement, while the control group dataset is indicative of not being exposed to an advertisement (block 202). For example, the covariate engine 108 may determine a covariate (e.g., age, income, etc.) to balance that is available across both the treatment group dataset and the control group dataset. The example weighting engine 110 may calculate a first set of weights for the first set of covariates corresponding to the treatment group dataset and a second set of weights for the second set of covariates corresponding to the control group dataset using maximum entropy, the first set of weights is to equal the second set of weights (block 204). For example, the weighting engine 110 may calculate the first set of weights and the second set of weights in a manner consistent with example Equations 5 and 6. The example weighting response engine 112 calculates a weighted response for the treatment group dataset and a weighted response for the control group dataset based on the first set of weights and the second set of weights (block 206). For example, the weighting response engine 112 may bypass multivariate reweighting by calculating the weighted response for the treatment group dataset and the weighted response for the control group dataset in a manner consistent with example Equations 7-10. The example weighting response engine 112 determines an average treatment effect based on a difference between the weighted response for the treatment dataset and the weighted response for the control dataset (block 208). For example, the weighting response engine 112 may determine the average treatment effect in manner consistent with example Equation 12. In some example, when no more treatment and control group datasets have been identified for processing, the example program 200 ends.

Figure 3:
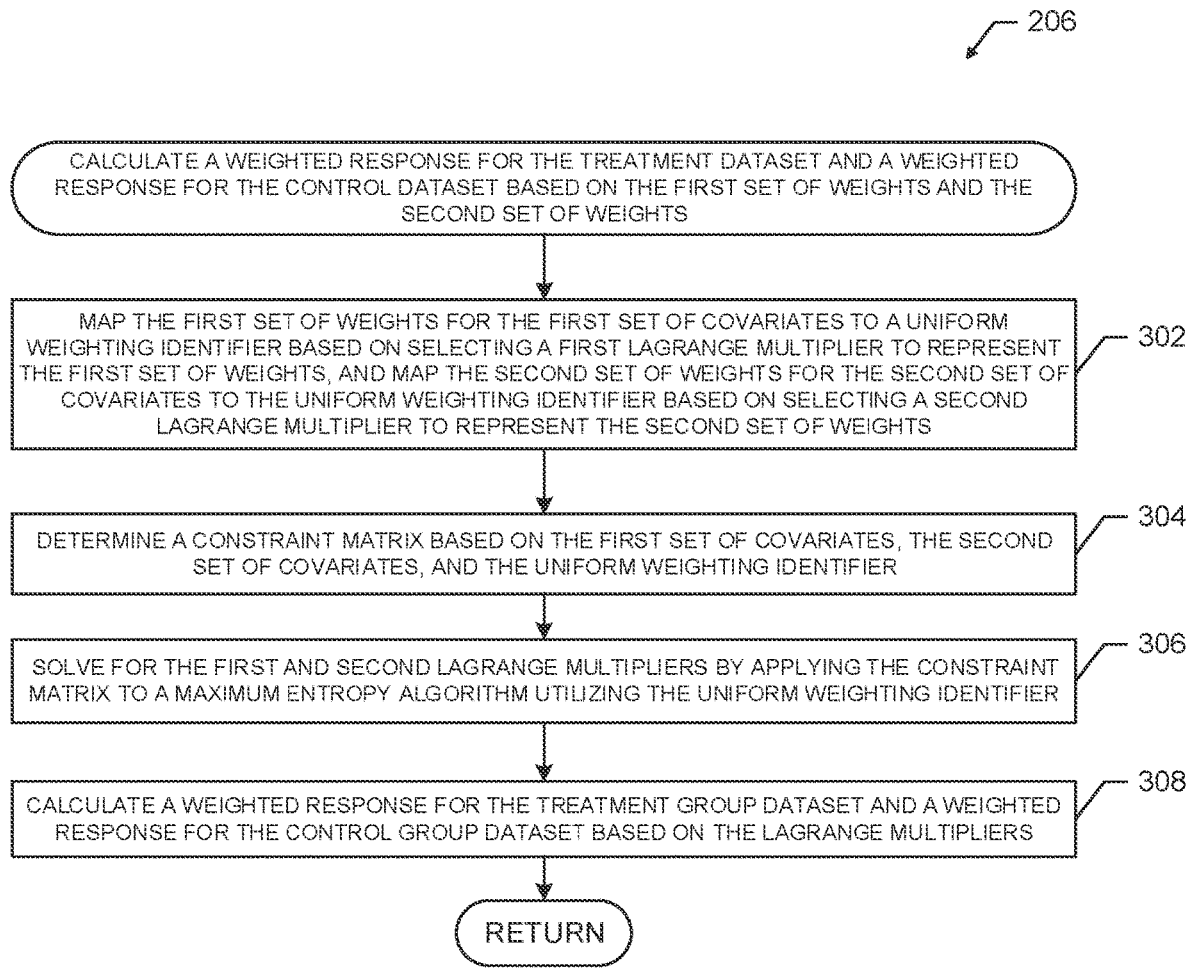

FIG. 3 illustrates an example of performing the processes of block 206 to leverage the analysis engine 102 to determine causal effects for audience measurement. In the illustrated example of FIG. 3, the example weighting engine 110 maps the first set of weights for the first set of covariates to a uniform weighting identifier based on selecting a first Lagrange multiplier to represent the first set of weights, and maps the second set of weights for the second set of covariates to the uniform weighting identifier based on selecting a second Lagrange multiplier to represent the second set of weights (block 302). For example, the weighting engine 110 maps the first and second set of weights to the uniform weighting identifier in manner consistent with example Equation 7. The example weighting engine 110 determines a constraint matrix based on the first set of covariates, the second set of covariates, and the uniform weighting identifier (block 304). For example, the weighting engine 110 may determine the constraint matrix in a manner consistent with example Equation 9. The weighting engine 110 solves for the first and second Lagrange multipliers by applying the constraint matrix to a maximum entropy algorithm utilizing the uniform weighting identifier (block 306). For example, the weighting engine 110 may solve the Lagrange multipliers in a manner consistent with example Equation 10. The example weighting engine 110 calculates a weighted response for the treatment group dataset and a weighted response for the control group dataset based on the Lagrange multipliers (block 308). For example, the weighting engine 110 calculates the weighted responses in a manner consistent with example Equation 10. The process returns to FIG. 2

Figure 4:
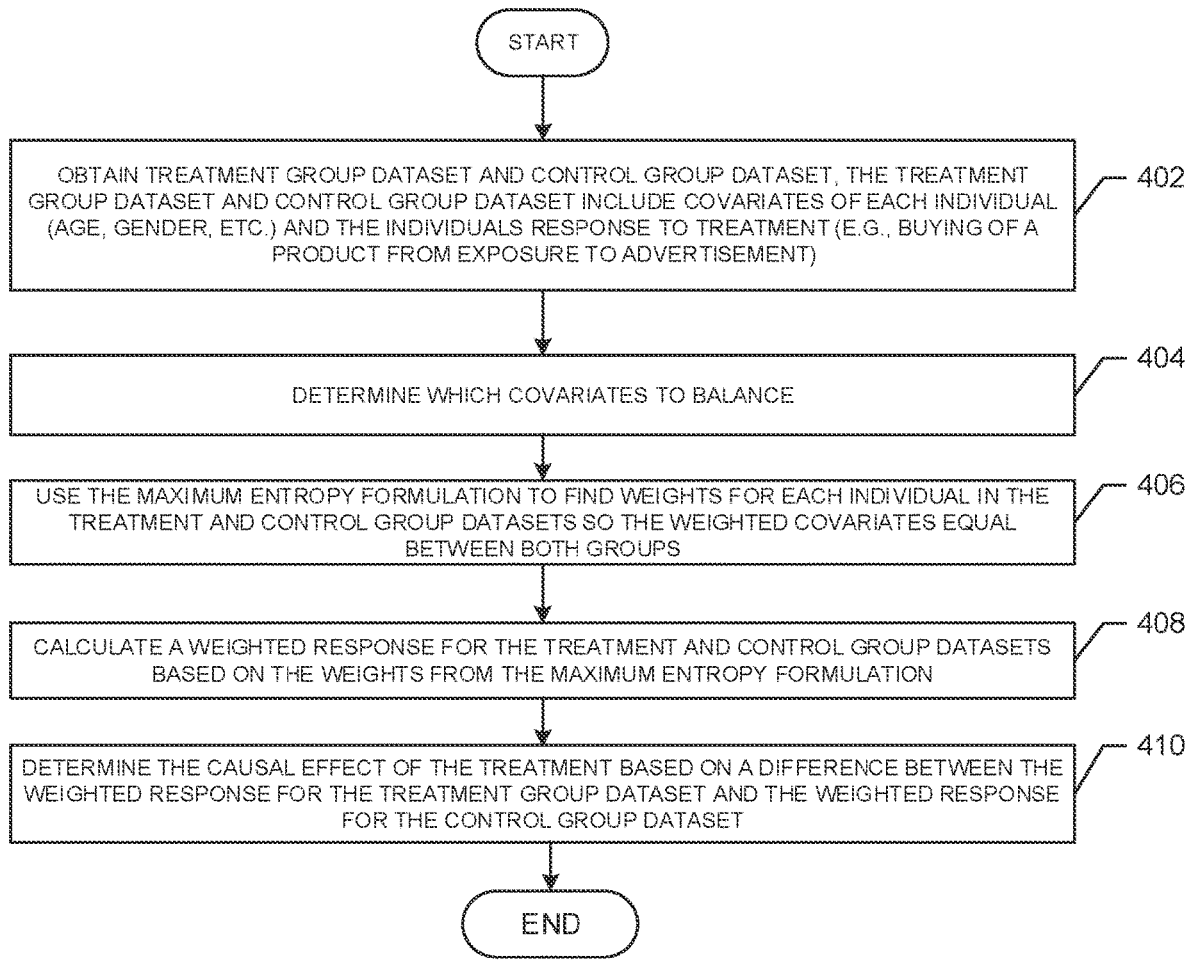

Unlike the illustrated example program 200 of FIG. 2, the illustrated example of FIG. 4 considers when a single treatment group dataset and a single control group dataset are present. An example program 400 that may be executed in the example environment 100 of FIG. 1 to leverage the analysis engine 102 to determine causal effects for audience measurement is illustrated in FIG. 4. In the illustrated example of FIG. 4, the program 400 includes instructions for execution by the analysis engine 102 when a single treatment group dataset and a single control group dataset are present. In the illustrated example of FIG. 4, the analysis engine 102 obtains treatment group dataset and control group dataset, the treatment group dataset and control group dataset include covariates of each individual (age, gender, etc.) and the individuals response to treatment (e.g., buying of a product from exposure to advertisement) (block 402). For example, the treatment/control data interface may obtain treatment and control group datasets from the treatment/control data store(s) 104. The covariate engine 108 determines which covariates to balance (block 404). For example, the covariate engine 108 may determine a covariate (e.g., age, income, etc.) to balance that is available across both the treatment group dataset and the control group dataset. The example weighting engine 110 uses the Maximum Entropy formulation to find weights for each individual in the treatment and control group datasets so the weighted covariates equal between both groups (block 406). For example, the weighting engine 110 may calculate the first stet of weights and the second set of weights in a manner consistent with example Equations 5 and 6. The example weighting response engine 112 calculates a weighted response for the treatment and control group datasets based on the weights from the Maximum Entropy formulation (block 408). For example, the weighting response engine 112 may calculate the weighted response for the treatment group dataset and the weighted response for the control group dataset in a manner consistent with example Equations 7-10. The example weighting response engine 112 determines the causal effect of the treatment based on a difference between the weighted response for the treatment group dataset and the weighted response for the control group dataset (block 410). For example, the weighting response engine 112 may determine the causal effect of the treatment in a manner consistent with example Equation 12. In some example, when no more treatment and control group datasets have been identified for processing, the example program 400 ends.

Figure 5:
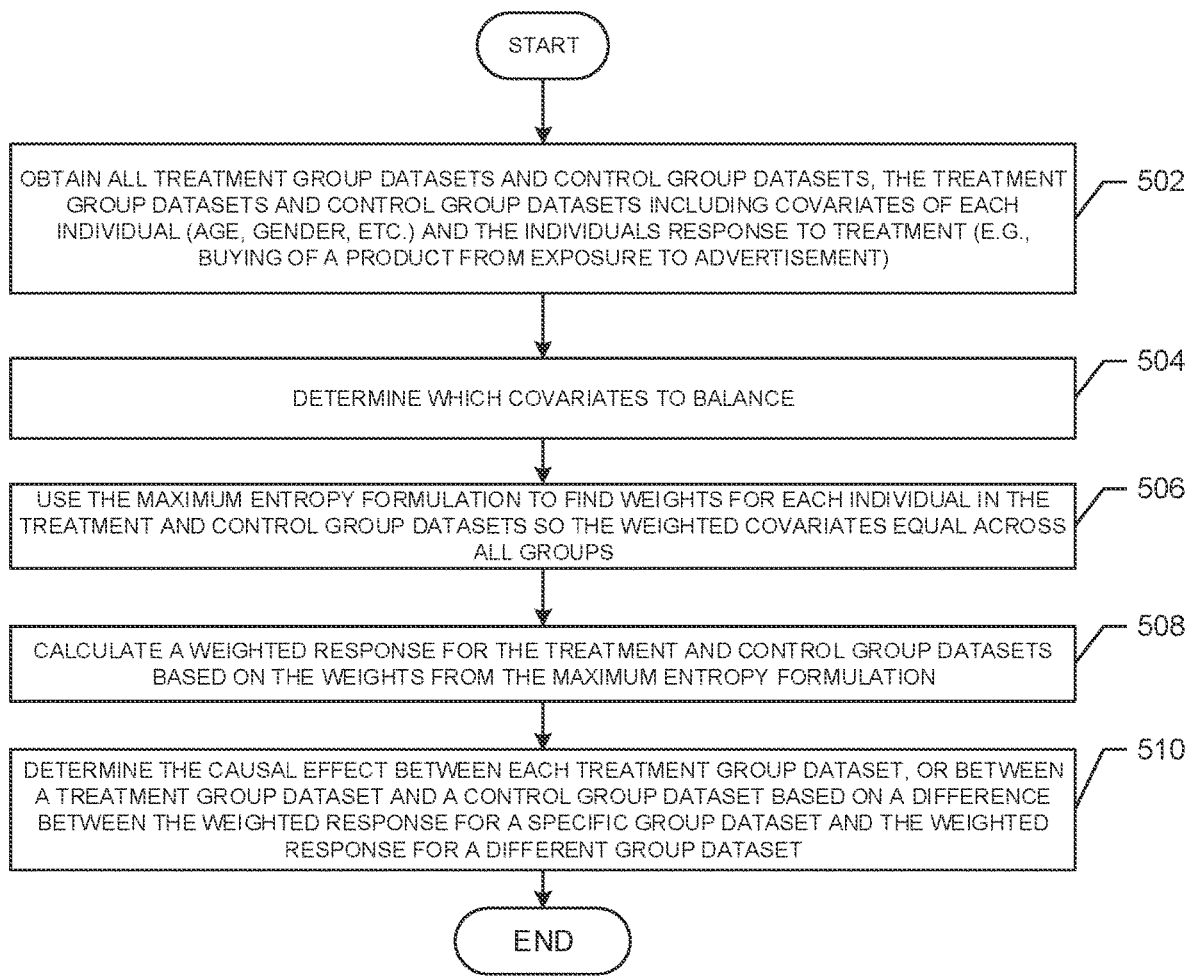

An example program 500 that may be executed in the example environment 100 of FIG. 1 to leverage the analysis engine 102 to determine causal effects for audience measurement is illustrated in FIG. 5. In the illustrated example of FIG. 5, the program 500 includes instructions for execution by the analysis engine 102 when multiple treatment group datasets and/or multiple control group datasets are present. In the illustrated example of FIG. 5, the analysis engine 102 obtains all treatment group datasets and control group datasets, the treatment group datasets and control group datasets including covariates of each individual (age, gender, etc.) and the individuals response to treatment (e.g., buying of a product from exposure to advertisement) (block 502). For example, the treatment/control data interface may obtain treatment and control group datasets from the treatment/control data store(s) 104. The covariate engine 108 determines which covariates to balance (block 504). For example, the covariate engine 108 may determine a covariate (e.g., age, income, etc.) to balance that is available across all the treatment group datasets and the control group datasets. The example weighting engine 110 uses the Maximum Entropy formulation to find weights for each individual in the treatment and control group datasets so the weighted covariates equal across all groups (block 506). For example, the weighting engine 110 may calculate the weights in a manner consistent with example Equation 13. The example weighting response engine 112 calculates a weighted response for the treatment and control group datasets based on the weights from the Maximum Entropy formulation (block 508). For example, the weighting response engine 112 may calculate the weighted response for the treatment group dataset and the weighted response for the control group dataset in a manner consistent with example Equations 13-16. The example weighting response engine 112 determines the causal effect between each treatment group dataset, or between a treatment group dataset and a control group dataset based on a difference between the weighted response for a specific group dataset and the weighted response for a different group dataset (block 510). For example, the weighting response engine 112 may determine the causal effect of the treatment in a manner consistent with example Equations 18 and 19. In some example, when no more treatment and control group datasets have been identified for processing, the example program 500 ends.

Figure 6:
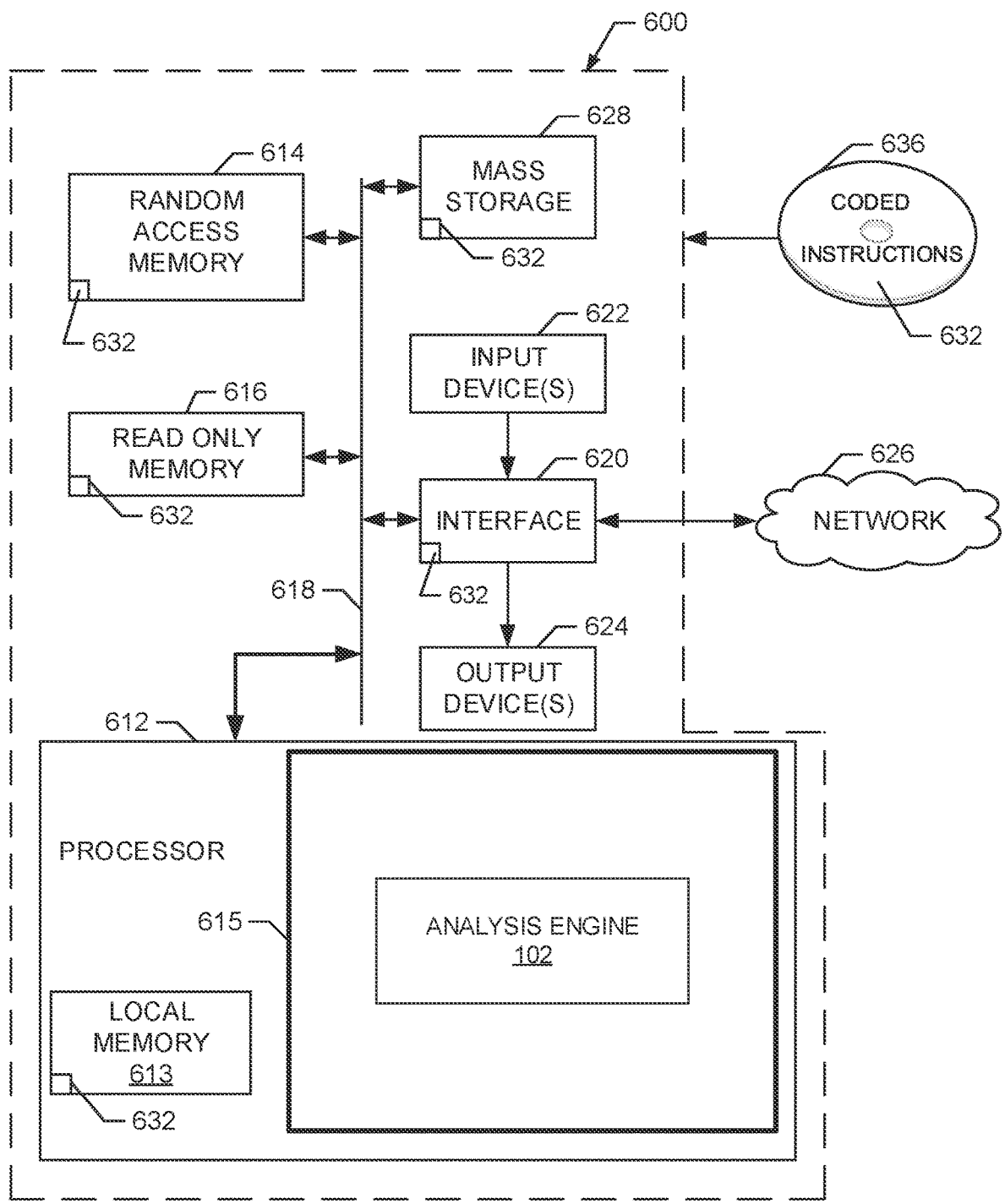
FIG. 6 is a block diagram of an example processor platform structured to execute the example machine readable instructions of FIGS. 2-5 to implement the example analysis engine of FIG. 1.

FIG. 6 is a block diagram of an example processor platform 600 structured to execute the example instructions of FIGS. 2-5 to implement the example analysis engine 102. The processor platform 600 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box a digital camera, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer. The hardware processor 612 may be a semiconductor based (e.g., silicon based) device. In this example, the processor 612 implements the example analysis engine 102.

The processor 612 of the illustrated example includes a local memory 613 (e.g., a cache). The processor 612 of the illustrated example is in communication with a main memory including a volatile memory 614 and a non-volatile memory 616 via a link 618. The link 618 may be implemented by a bus, one or more point-to-point connections, etc., or a combination thereof. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and commands into the processor 612. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 600, can allow the user to control the computer system and provide data to the computer using physical gestures, such as, but not limited to, hand or body movements, facial expressions, and face recognition.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID (redundant array of independent disks) systems, and digital versatile disk (DVD) drives.

Coded instructions 632 corresponding to the instructions of FIGS. 2-5 may be stored in the mass storage device 628, in the volatile memory 614, in the non-volatile memory 616, in the local memory 613 and/or on a removable tangible computer readable storage medium, such as a CD or DVD 636.

From the foregoing, it will be appreciated that example methods, apparatus and articles of manufacture have been disclosed that improve the operating efficiency of computing devices by calculating weights for covariates simultaneously. Such disclosed examples increase the computational efficiency of determining causal effects for audience measurement by reducing the amount of processing cycles required to re-process another set of covariates for a treatment/control group dataset. The disclosed methods, apparatus and articles of manufacture are accordingly directed to one or more improvement(s) in the functioning of a computer.

The following paragraphs provide various examples of the examples disclosed herein.

Example 1 can be a weighting engine to calculate a first set of weights for a first set of covariates corresponding to a treatment dataset and a second set of weights for a second set of covariates corresponding to a control dataset using maximum entropy, the first set of weights to equal the second set of weights; and a weighting response engine to calculate a weighted response for the treatment dataset and a weighted response for the control dataset by: mapping the first set of weights and the second set of weights to a uniform weighting identifier, determining a constraint matrix based on the first set of weights, the second set of weights and the uniform weighting identifier, and bypassing multivariate reweighting by calculating the weighted response for the treatment dataset and the weighted response for the control dataset by applying maximum entropy to the constraint matrix.

Example 2 includes the apparatus of example 1, further including a covariate engine to determine the first set of covariates to be processed for the treatment dataset of an advertisement campaign and the second set of covariates to be processed for the control dataset of the advertisement campaign, the treatment dataset indicative of being exposed to an advertisement, the control dataset indicative of not being exposed to an advertisement.

Example 3 includes the apparatus of any one of examples 1-2, wherein the weighting engine is to determine the first set of weights independent of the second set of weights to increase an operational efficiency of the apparatus.

Example 4 includes the apparatus of any one of examples 1-3, wherein the weighting response engine is to calculate the weighted response for the treatment dataset and the weighted response for the control dataset so that the weighted response for the treatment dataset and the weighted response for the control dataset are on a common scale.

Example 5 includes the apparatus of any one of examples 1-4, wherein the weighting response engine is to determine an average treatment effect by determining a difference between the weighted response for the treatment dataset and the weighted response for the control dataset, the average treatment effect indicative of a potential increase per individual exposed to an advertisement campaign.

Example 6 includes the apparatus of any one of examples 1-5, further including a report generator to transmit a report to an audience measurement entity.

Example 7 includes the apparatus of any one of examples 1-6, wherein the report generator is to display the report on a device via a webpage in a first state with a set of options, the options selectable by a user to change to the first state.

Example 8 can be a non-transitory computer readable medium comprising instructions that, when executed, cause a machine to at least calculate a first set of weights for a first set of covariates corresponding to a treatment dataset and a second set of weights for a second set of covariates corresponding to a control dataset using maximum entropy, the first set of weights to equal the second set of weights; and calculate a weighted response for the treatment dataset and a weighted response for the control dataset by: mapping the first set of weights and the second set of weights to a uniform weighting identifier, determining a constraint matrix based on the first set of weights, the second set of weights and the uniform weighting identifier, and bypassing multivariate reweighting by calculating the weighted response for the treatment dataset and the weighted response for the control dataset by applying maximum entropy to the constraint matrix.

Example 9 includes the non-transitory computer readable medium of example 8, wherein the instructions further cause the machine to determine the first set of covariates to be processed for the treatment dataset of an advertisement campaign and the second set of covariates to be processed for the control dataset of the advertisement campaign, the treatment dataset indicative of being exposed to an advertisement, the control dataset indicative of not being exposed to an advertisement.

Example 10 includes the non-transitory computer readable medium of any one of examples 8-9, wherein the instructions further cause the machine to determine the first set of weights independent of the second set of weights to increase an operational efficiency of the apparatus.

Example 11 includes the non-transitory computer readable medium of any one of examples 8-10, wherein the instructions further cause the machine to calculate the weighted response for the treatment dataset and the weighted response for the control dataset so that the weighted response for the treatment dataset and the weighted response for the control dataset are on a common scale.

Example 12 includes the non-transitory computer readable medium of any one of examples 8-11, wherein the instructions further cause the machine to determine an average treatment effect by determining a difference between the weighted response for the treatment dataset and the weighted response for the control dataset, the average treatment effect indicative of a potential increase per individual exposed to an advertisement campaign.

Example 13 includes the non-transitory computer readable medium of any one of examples 8-12, wherein the instructions further cause the machine to transmit a report to an audience measurement entity.

Example 14 includes the non-transitory computer readable medium of any one of examples 8-13, wherein the instructions further cause the machine to display the report on a device via a webpage in a first state with a set of options, the options selectable by a user to change to the first state.

Example 15 can be means for calculating a weight to calculate a first set of weights for a first set of covariates corresponding to a treatment dataset and a second set of weights for a second set of covariates corresponding to a control dataset using maximum entropy, the first set of weights to equal the second set of weights; and means for determining a weighted response to calculate a weighted response for the treatment dataset and a weighted response for the control dataset by: mapping the first set of weights and the second set of weights to a uniform weighting identifier, determining a constraint matrix based on the first set of weights, the second set of weights and the uniform weighting identifier, and bypassing multivariate reweighting by calculating the weighted response for the treatment dataset and the weighted response for the control dataset by applying maximum entropy to the constraint matrix.

Example 16 includes the apparatus of example 15, further including means for generating a covariate to determine the first set of covariates to be processed for the treatment dataset of an advertisement campaign and the second set of covariates to be processed for the control dataset of the advertisement campaign, the treatment dataset indicative of being exposed to an advertisement, the control dataset indicative of not being exposed to an advertisement.

Example 17 includes the apparatus of any one of examples 15-16, wherein the weight calculating means is to determine the first set of weights independent of the second set of weights to increase an operational efficiency of the apparatus.

Example 18 includes the apparatus of any one of examples 15-17, wherein the weighted response determining means is to calculate the weighted response for the treatment dataset and the weighted response for the control dataset so that the weighted response for the treatment dataset and the weighted response for the control dataset are on a common scale.

Example 19 includes the apparatus of any one of examples 15-18, wherein the weighted response determining means is to determine an average treatment effect by determining a difference between the weighted response for the treatment dataset and the weighted response for the control dataset, the average treatment effect indicative of a potential increase per individual exposed to an advertisement campaign.

Example 20 includes the apparatus of any one of examples 15-19, further including means for generating a report to display a report on a device via a webpage in a first state with a set of options, the options selectable by a user to change to the first state.

Example 21 can be calculating, by executing an instruction with a processor, a first set of weights for a first set of covariates corresponding to a treatment dataset and a second set of weights for a second set of covariates corresponding to a control dataset using maximum entropy, the first set of weights to equal the second set of weights; and calculating, by executing an instruction with the processor, a weighted response for the treatment dataset and a weighted response for the control dataset by: mapping the first set of weights and the second set of weights to a uniform weighting identifier, determining a constraint matrix based on the first set of weights, the second set of weights and the uniform weighting identifier, and bypassing multivariate reweighting by calculating the weighted response for the treatment dataset and the weighted response for the control dataset by applying maximum entropy to the constraint matrix.

Example 22 includes the method of example 21, further including determining the first set of covariates to be processed for the treatment dataset of an advertisement campaign and the second set of covariates to be processed for the control dataset of the advertisement campaign, the treatment dataset indicative of being exposed to an advertisement, the control dataset indicative of not being exposed to an advertisement.

Example 23 includes the method of any one of examples 21-22, further including determining the first set of weights independent of the second set of weights to increase an operational efficiency of the apparatus.

Example 24 includes the method of any one of examples 21-23, further including determining the weighted response for the treatment dataset and the weighted response for the control dataset so that the weighted response for the treatment dataset and the weighted response for the control dataset are on a common scale.

Example 25 includes the method of any one of examples 21-24, further including determining an average treatment effect by determining a difference between the weighted response for the treatment dataset and the weighted response for the control dataset, the average treatment effect indicative of a potential increase per individual exposed to an advertisement campaign.

Example 26 includes the method of any one of examples 21-25, further including transmitting a report to an audience measurement entity.

Example 27 includes the method of any one of examples 21-26, further including displaying the report on a device via a webpage in a first state with a set of options, the options selectable by a user to change to the first state.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An audience measurement computing system comprising:
   at least one processor; and
   memory having stored therein computer readable instructions that, upon execution by the at least one processor, cause the audience measurement computing system to at least:
      obtain a dataset indicative of a set of individuals each associated with (i) respective covariates and (ii) respective outcomes;
      identify, from amongst the obtained dataset, a first treatment dataset corresponding to first individuals who have been exposed to a first treatment of an advertisement, the first treatment dataset having first covariates;
      identify, from amongst the obtained dataset, a second treatment dataset corresponding to second individuals who have been exposed to a second treatment of the advertisement, the second treatment dataset having second covariates;
      identify, from amongst the obtained dataset, a control dataset corresponding to third individuals who have not been exposed to the advertisement, the control dataset having third covariates;
      determine at least one covariate included in the first covariates, the second covariates, and the third covariates to balance between the first and second treatment datasets and the control dataset;
      simultaneously compute, via maximum entropy, first weights for the first covariates, second weights for the second covariates, and third weights for the third covariates while constraining the first weights, the second weights, and the third weights such that a sum of the first weights applied respectively to the determined at least one covariate to balance across the first individuals equals a sum of the second weights applied respectively to the determined at least one covariate to balance across the second individuals and equals a sum of the third weights applied respectively to the determined at least one covariate to balance across the third individuals;

compute a first weighted response for the first treatment dataset based on the first weights and respective outcomes corresponding to the first weights;

compute a second weighted response for the second treatment dataset based on the second weights and respective outcomes corresponding to the second weights;

compute a third weighted response for the control dataset based on the third weights and respective outcomes corresponding to the third weights;

determining an effect of the first treatment of the advertisement based on a difference between the first weighted response and the third weighted response;

determine an effect of the second treatment of the advertisement based on a difference between the second weighted response and the third weighted response;

compare the determined effect of the second treatment of the advertisement with the determined effect of the first treatment of the advertisement; and report an indication of the determined comparison between the determined effect of the second treatment of the advertisement and the determined effect of the first treatment of the advertisement.

2. The audience measurement computing system of claim 1, wherein the computer readable instructions further cause, upon execution by the at least one processor, the audience measurement computing system to:

identify at least one additional covariate to balance that is included in both the first treatment dataset and the control dataset, wherein simultaneously computing the first weights, the second weights, and the third weights is further constrained by the at least one additional covariate to balance such that a sum of the first weights applied respectively to the at least one additional covariate to balance across the first individuals equals a sum of the second weights applied respectively to the at least one additional covariate to balance across the second individuals and also equals a sum of the third weights applied respectively to the at least one additional covariate to balance across the third individuals.

3. The audience measurement computing system of claim 1, wherein the computer readable instructions further cause, upon execution by the at least one processor, the audience measurement computing system to report the indication by displaying the indication via a webpage.

4. The audience measurement computing system of claim 1, wherein the effect of the first treatment of the advertisement is indicative of an average monetary change in purchases by the first individuals.

5. The audience measurement computing system of claim 1, wherein the computer readable instructions further cause, upon execution by the at least one processor, the audience measurement computing system to:

responsive to simultaneously computing the first weights, the second weights, and the third weights, bypass multivariate reweighting to thereby improve performance of the audience measurement computing system by computing the first weighted response and the second weighted response based on the first weights and second weights, respectively, previously simultaneously computed via maximum entropy within a single processing clock cycle.

6. The audience measurement computing system of claim 1, wherein simultaneously computing the first weights, the second weights, and the third weights, via maximum entropy, includes computing the first weights, the second weights, and the third weights within a single processing clock cycle.

7. The audience measurement computing system of claim 1, wherein:

the first covariates are indicative of first ages and first genders of the first individuals;

the second covariates are indicative of second ages and second genders of the second individuals; and the third covariates are indicative of third ages and third genders of the third individuals.

8. A non-transitory computer readable medium comprising instructions that, when executed by at least one processor of a computing system, cause the computing system to at least:

obtain a dataset indicative of a set of individuals each associated with (i) respective covariates and (ii) respective outcomes;

identify, from amongst the obtained dataset, a first treatment dataset corresponding to first individuals who have been exposed to a first treatment of an advertisement, the first treatment dataset having first covariates;

identify, from amongst the obtained dataset, a second treatment dataset corresponding to second individuals who have been exposed to a second treatment of the advertisement, the second treatment dataset having second covariates identify, from amongst the obtained dataset, a control dataset corresponding to third individuals who have not been exposed to the advertisement, the control dataset having third covariates;

determine at least one covariate included in the first covariates, the second covariates, and the third covariates to balance between the first and second treatment datasets and the control dataset;

simultaneously compute, via maximum entropy, first weights for the first covariates, second weights for the second covariates, and third weights for the third covariates while constraining the first weights, the second weights, and the third weights such that a sum of the first weights applied respectively to the determined at least one covariate to balance across the first individuals equals a sum of the second weights applied respectively to the determined at least one covariate to balance across the second individuals and also equals a sum of the third weights applied respectively to the determined at least one covariate to balance across the third individuals;

compute a first weighted response for the first treatment dataset based on the first weights and respective outcomes corresponding to the first weights;

compute a second weighted response for the second treatment dataset based on the second weights and respective outcomes corresponding to the second weights;

compute a third weighted response for the control dataset based on the third weights and respective outcomes corresponding to the third weights;

determine an effect of the first treatment of the advertisement based on a difference between the first weighted response and the third weighted response;

determine an effect of the second treatment of the advertisement based on a difference between the first weighted response and the third weighted response;

compare the determined effect of the second treatment of the advertisement with the determined effect of the first treatment of the advertisement; and report an indication of the determined comparison between the determined effect of the second treatment of the advertisement and the determined effect of the first treatment of the advertisement.

9. The non-transitory computer readable medium of claim 8, wherein the instructions further cause, when executed by the at least one processor, the computing system to:

identify at least one additional covariate to balance that is included in-both the first treatment dataset, the second treatment dataset, and the control dataset, wherein simultaneously computing the first weights, the second weights, and the third weights is further constrained by the at least one additional covariate to balance such that a sum of the first weights applied respectively to the at least one additional covariate to balance across the first individuals equals a sum of the second weights applied respectively to the at least one additional covariate to balance across the second individuals and also equals a sum of the third weights applied respectively to the at least one additional covariate to balance across the third individuals.

10. The non-transitory computer readable medium of claim 8, wherein the instructions further cause, when executed by the at least one processor, the computing system to report the indication by displaying the indication via a webpage.

11. The non-transitory computer readable medium of claim 8, wherein the first weighted response shares a common scale with the second weighted response.

12. The non-transitory computer readable medium of claim 8, wherein simultaneously computing the first weights, the second weights, and the third weights, via maximum entropy, includes computing the first weights, the second weights, and the third weights within a single processing clock cycle.

13. The non-transitory computer readable medium of claim 8, wherein:

the first covariates are indicative of first ages and first genders of the first individuals;

the second covariates are indicative of second ages and second genders of the second individuals; and the third covariates are indicative of third ages and third genders of the third individuals.

14. A method comprising:

obtaining a dataset indicative of a set of individuals each associated with (i) respective covariates and (ii) respective outcomes;

identifying, from amongst the obtained dataset, a first treatment dataset corresponding to first individuals who have been exposed to a first treatment of an advertisement, the first treatment dataset having first covariates;

identifying, from amongst the obtained dataset, a second treatment dataset corresponding to second individuals who have been exposed to a second treatment of the advertisement, the second treatment dataset having second covariates;

identifying, from amongst the obtained dataset, a control dataset corresponding to third individuals who have not been exposed to the advertisement, the control dataset having third covariates;

determining at least one covariate included in the first covariates, the second covariates, and the third covariates to balance between the first and second treatment datasets and the control dataset;

simultaneously computing, by executing an instruction with at least one processor, via maximum entropy, first weights for the first covariates, second weights for the second covariates, and third weights for the third covariates while constraining the first weights, the second weights, and the third weights such that a sum of the first weights applied respectively to the determined at least one covariate to balance across the first individuals equals a sum of the second weights applied respectively to the determined at least one covariate to balance across the second individuals and equals a sum of the third weights applied respectively to the determined at least one covariate to balance across the third individuals;

computing a first weighted response for the first treatment dataset based on the first weights and respective outcomes corresponding to the first weights;

computing a second weighted response for the second treatment dataset based on the second weights and respective outcomes corresponding to the second weights;

computing a third weighted response for the control dataset based on the third weights and respective outcomes corresponding to the third weights;

determining an effect of the first treatment of the advertisement based on a difference between the first weighted response and the third weighted response;

determining an effect of the second treatment of the advertisement based on a difference between the second weighted response and the third weighted response;

comparing the determined effect of the second treatment of the advertisement with the determined effect of the first treatment of the advertisement; and reporting an indication of the determined comparison between the determined effect of the second treatment of the advertisement and the determined effect of the first treatment of the advertisement.

15. The method of claim 14, further including identifying at least one additional covariate to balance that is included in both the first treatment dataset and the control dataset, wherein simultaneously computing the first weights, the second weights, and the third weights is further constrained by the at least one additional covariate to balance such that a sum of the first weights applied respectively to the at least one additional covariate to balance across the first individuals equals a sum of the second weights applied respectively to the at least one additional covariate to balance across the second individuals and also equals a sum of the third weights applied respectively to the at least one additional covariate to balance across the third individuals.

16. The method of claim 14, wherein reporting the indication includes displaying the indication via a webpage.

17. The method of claim 14, wherein the first weighted response shares a common scale with the second weighted response.

18. The method of claim 14, wherein simultaneously computing the first weights, the second weights, and the third weights, via maximum entropy, includes computing the first weights, the second weights, and the third weights within a single processing clock cycle.

19. The method of claim 14, wherein:
the first covariates are indicative of first ages and first genders of the first individuals;
the second covariates are indicative of second ages and second genders of the second individuals; and
the third covariates are indicative of third ages and third genders of the third individuals.

* * * * *